US012296446B2

(12) United States Patent
Erbele et al.

(10) Patent No.: US 12,296,446 B2
(45) Date of Patent: May 13, 2025

(54) METHOD FOR OPERATING A HAND-HELD POWER TOOL

(71) Applicant: Robert Bosch GmbH, Stuttgart (DE)

(72) Inventors: Simon Erbele, Nufringen (DE); Wolfgang Herberger, Stuttgart (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 18/256,615

(22) PCT Filed: Nov. 25, 2021

(86) PCT No.: PCT/EP2021/082981
§ 371 (c)(1),
(2) Date: Jun. 8, 2023

(87) PCT Pub. No.: WO2022/128388
PCT Pub. Date: Jun. 23, 2022

(65) Prior Publication Data

US 2024/0033884 A1 Feb. 1, 2024

(30) Foreign Application Priority Data

Dec. 16, 2020 (DE) ..................... 10 2020 215 988.2

(51) Int. Cl.
*B25B 23/14* (2006.01)
*B25B 23/147* (2006.01)

(52) U.S. Cl.
CPC ................................ *B25B 23/1475* (2013.01)

(58) Field of Classification Search
USPC ............................................................. 173/1
See application file for complete search history.

(56) References Cited

U.S. PATENT DOCUMENTS 6,571,179 B2 * 5/2003 Siegel ..................... B25B 23/14
702/33
9,744,658 B2 8/2017 Simeone et al.
(Continued)

FOREIGN PATENT DOCUMENTS

DE 10 2006 047 683 B3 4/2008
DE 10 2015 009 395 A1 1/2017
(Continued)

OTHER PUBLICATIONS

International Search Report corresponding to PCT Application No. PCT/EP2021/082981, mailed Feb. 23, 2022 (German and English language document) (6 pages).

*Primary Examiner* — Chinyere J Rushing-Tucker
(74) *Attorney, Agent, or Firm* — Maginot, Moore & Beck LLP

(57) ABSTRACT

A method for operating a hand-held power tool is disclosed, wherein the hand-held power tool includes an electric motor. The method includes carrying out a screw connection of a connecting device in a support, providing at least one signal of an operating variable of the electric motor during the screwing, evaluating the received signal of the operating variable of the electric motor, and deciding whether the screw connection has been properly carried out, the decision being at least partially based on the evaluation of the received signal of the operating variable of the electric motor. A hand-held power tool is also disclosed.

20 Claims, 15 Drawing Sheets

(56) References Cited

U.S. PATENT DOCUMENTS

| | | | |
|---|---|---|---|
| 10,792,795 B2 | 10/2020 | Lee et al. | |
| 2010/0147545 A1 | 6/2010 | Hirt et al. | |
| 2014/0262389 A1* | 9/2014 | Simeone | B25B 21/00 173/1 |
| 2018/0333831 A1* | 11/2018 | Lee | G01L 25/003 |

FOREIGN PATENT DOCUMENTS

| | | |
|---|---|---|
| DE | 10 2015 111 316 B4 | 9/2017 |
| DE | 10 2016 222 700 A1 | 5/2018 |
| DE | 10 2019 204 071 A1 | 10/2020 |
| DE | 10 2019 211 305 A1 | 2/2021 |
| EP | 3 202 537 A1 | 8/2017 |
| EP | 3 381 615 A1 | 10/2018 |
| WO | 2017/174415 A1 | 10/2017 |

* cited by examiner f(x)
x
310
200
322
324
900
902 q(x)
x
202
SP
201

METHOD FOR OPERATING A HAND-HELD POWER TOOL

This application is a 35 U.S.C. § 371 National Stage Application of PCT/EP2021/082981, filed on Nov. 25, 2021, which claims the benefit of priority to Serial No. DE 10 2020 215 988.2 filed on Dec. 16, 2020 in Germany, the disclosures of which are incorporated herein by reference in their entirety.

The disclosure relates to a method for operating a hand-held power tool and a hand-held power tool configured so as to carry out the method. In particular, the present disclosure relates to a method for quality assurance in a screw connection carried out with a hand-held power tool.

BACKGROUND

From the prior art, see for example EP 3 202 537 A1, rotary impact wrenches for tightening screw elements, such as threaded nuts and screws, are known. For example, a rotary impact wrench of this type comprises a structure in which an impact in a rotational direction is transferred to a screw element by a rotational impact of a hammer. The rotary impact wrench, which has this construction, comprises a motor, a hammer to be driven by the motor, an anvil that is struck by the hammer, and a tool. The rotary impact wrench further comprises a position sensor detecting a position of the motor and a controller coupled to the position sensor. The controller senses an impact of the impact mechanism, calculates a drive angle of the anvil caused by the impact based on the position sensor output, and controls the brushless DC motor based on the drive angle.

From U.S. Pat. No. 9,744,658, an electrically driven tool with an impact mechanism is also known, wherein the hammer is driven by the motor. The rotary impact wrench further comprises a method for recording and rendering an engine parameter.

Rotary screwdrivers are used in a variety of applications, among others in direct screw connections, for example in concrete or natural stones with a dense structure, using specific concrete screws. An anchor is not necessary in these screwing applications. This saves time during assembly and has the advantage of a connection that is free of spray pressure. Upon insertion, the thread cuts an accurately adjusted counter-thread into the substrate.

For example, a problem with this type of direct screw connection occurs when the user continues the rotational screwing operation with a screw already tightened in the impact operation, wherein the grooved or cut thread in the material, or the screw itself, can be destroyed. If the user does not notice this defect and leaves the screw connection in this condition, this can lead to failure of the screw connection at a later time.

When using rotary impact wrenches, a high level of concentration on work progress is required on the user's side in order to ensure that certain machine characteristics, for example the starting or stopping of the impact mechanism are reacted to accordingly, for example in order to stop the electric motor and/or to carry out a change in the speed via the hand switch. Because it is often not possible for the user to react quickly enough or appropriately to a work progress, it can be possible when using rotary impact wrenches to over-tighten screws during screwing-in operations and to drop screws during unscrewing operations when they are unscrewed at too high a speed.

Therefore, it is generally desirable to further automate the operation and help the customer to more easily achieve a fully completed work progress and to reliably ensure reproducible screwing-in and unscrewing operations of high quality.

Furthermore, the user is to be supported by reactions or routines of the device that are appropriate for the work progress and machine-triggered, so-called intelligent tool functions. Examples of such machine-triggered reactions or routines include, for example, shutting down the motor, changing the motor speed, or triggering a warning to the user.

The provision of such intelligent tool functions can be accomplished, among other things, by identifying the currently set operating condition. An identification of the latter is carried out in the prior art, independent of determining a work progress or the status of an application, for example by monitoring the operating variables of the electric motor, such as speed and electric motor current. In this context, the operating variables are examined as to whether certain limit values and/or threshold values are achieved. Corresponding evaluation methods operate with absolute threshold values and/or signal gradients.

It is disadvantageous here that a fixed limit value and/or threshold value can be perfectly set for practically only one application. As soon as the application case changes, the associated power or speed values or their temporal curves also change, and an impact detection based on the set limit value and/or threshold value or their temporal curves no longer functions.

For example, it can be the case that an automatic shutdown based on the detection of the impact operation reliably shuts down at different speed ranges in individual applications when using self-tapping screws, but, in other applications when using self-tapping screws, no shutdown occurs.

In other methods for determining modes of operation for rotary impact wrench, additional sensors, such as accelerometers, are used in order to use vibrational conditions of the tool to conclude the current mode of operation.

Disadvantages of these methods are additional cost for the sensors, as well as to the robustness of the hand-held power tool, because the number of installed components and electrical connections increases compared to hand-held power tools without this sensor technology.

Furthermore, simple information as to whether or not the impact mechanism works is not sufficient to be able to make accurate statements about the work progress. For example, when screwing in certain wood screws, the rotary impact mechanism starts very early, while the screw is not yet fully screwed into the material, but the required torque already exceeds the so-called disengagement torque of the rotary impact mechanism. Thus, a response purely on the basis of the operating condition (impact operation and no impact operation) of the rotary mechanism is not sufficient for a correct automatic system function of the tool, for example a shutdown.

In principle, there is the problem of automating operation as far as possible, even in other hand-held power tools, such as impact drills, so that the disclosure is not limited to rotary impact wrenches.

A further aspect of the disclosure comprises the automated information exchange in the context of interconnection of devices through Internet of Things solutions. In this regard, power tools can record and provide data for processing.

SUMMARY

The problem addressed by the disclosure is to provide an improved method for operating a hand-held power tool compared to the prior art, which at least partly overcomes the aforementioned disadvantages, or at least is an alternative to the prior art. A further problem is to specify a corresponding hand-held power tool.

This problem is solved by way of the respective subject-matter of the description below. Advantageous configurations of the disclosure are the subject-matter of the description that follows.

According to the present disclosure, there is provided a method for operating a hand-held power tool with an electric motor, comprising the method steps A carrying out a screw connection of a connecting means in a support;

S2 providing at least one signal of an operating variable of the electric motor during the screw connection;

C evaluating the received signal of the operating variable of the electric motor;

D deciding whether the screw connection has been properly carried out, the decision being at least partially based on the evaluation of the received signal of the electric motor.

The method according to the disclosure thus makes a contribution to the documentation and quality assurance of screws by exploiting intelligent tool functions in the context of the ever-evolving digitalization of planning and execution (keyword here: "interconnected worksite 4.0").

The provision of the signal of the operating variable also comprises a possible signal processing of a measured signal, for example in the sense of a classification or a clustering of a measured signal.

By the method according to the disclosure, a user of the hand-held power tool is effectively assisted in achieving reproducibly high-quality application results as well as in the automated detection of improperly executed screw connections. This can often detect and correct unavoidable user errors.

In order to document whether a screw connection, for example a concrete direct screw connection, was carried out properly, a characteristic documentation of the screw connection with a rotary impact wrench is disclosed according to the disclosure. Thus, a verifiable, complete documentation of the professional execution of fastenings is ensured at all times.

The disclosure is applicable to any type of screw connection, using anchors and/or self-tapping screws. The disclosure can be particularly advantageous for detecting an incorrectly tightened self-tapping screw, in particular in the case of a direct concrete screw connection.

Thus, the disclosure makes it possible to provide the user with aid, with which a consistent work quality is possible with as little effort as possible.

In one embodiment, the operating variable is a speed of the electric motor or an operating variable correlating to the speed.

If the motor speed of the rotary impact wrench is plotted over time, a screw connection can be characterized. The deeper the screw is submerged in the material, the higher the impact frequency will become. The engine speed in turn fluctuates at this impact frequency. The higher the impact frequency, the lower the motor speed simultaneously becomes. The original so-called "soft screwing case" will increasingly become a "hard screwing case."

If a screw connection at which the impact frequency increases continuously (especially in the case of head support), a drop in the impact frequency, i.e. an increase in the motor speed upon decrease of a speed fluctuation, is registered, this is an indication that the screw connection was not carried out properly.

In one embodiment, the connecting means is a self-tapping screw, preferably a self-tapping concrete screw.

In one embodiment, the support consists at least partially of concrete, preferably of reinforced concrete.

In one embodiment, the method according to the disclosure comprises the method step of visualizing the evaluation of the documented signal of the electric motor on a human-machine interface (HMI) of the hand-held power tool, in particular visualizing an incorrect screw connection.

In one embodiment, the method according to the present disclosure comprises the method step of sending a notification regarding the evaluation of the received signal of the electric motor to an external device, in particular regarding an incorrectly processed screw connection. Sending a notification can comprise sending a push notification to a hand-held device, in particular a smartphone.

In one embodiment, the method according to the disclosure comprises the method step of documenting the evaluation of the received signal of the electric motor, in particular documenting an incorrectly processed screw connection in a documentation base, preferably in a 3D blueprint. Here, the method step of documentation comprises the detection and storage of a position of the screw connection, in particular using a locating sensor of the hand-held power tool.

In one embodiment, the step of evaluating the received signal of the electric motor can comprise the following steps:

S1 providing at least one condition-typical model signal form, wherein the condition-typical model signal form is assignable to the work progress of the hand-held power tool;

S3 comparing the signal of the operating variable to the condition-typical model signal form and ascertaining an agreement evaluation from the comparison;

S4 detecting the work progress at least partly using the agreement evaluation ascertained in method step S3.

Detecting the work progress is taken into account in embodiments of the disclosure when deciding whether the screw connection has been properly carried out.

If, for example, it is determined that the work progress at the time of the end of the screwing operation corresponds to the condition in which a screw head already resting on the mounting carrier is continued to be rotated, this can be used as an indication that the thread grooved or cut into the screw base has been at least partially destroyed and the screw connection has accordingly not been carried out properly.

The work progress of the improper screw connection is characterized in such a case in that, with a continuous increase in the impact frequency during the screwing operation, a drop in the impact frequency, i.e. an increase in the motor speed when the speed amplitude is reduced, is registered.

The approach for detecting the work progress via operating variables in the in-tool measured variables, for example the speed of the electric motor, proves to be particularly advantageous, because with this method the work progress is carried out particularly reliably and largely independently of the general operating condition of the tool or the application case.

In particular, additional sensor units for detecting the in-tool measured variables are essentially omitted, for example an accelerometer unit, so that substantially exclusively the method according to the disclosure is used in order to detect the work progress.

In particular, in method step S1, the model signal form can be set variably, in particular by a user. Here, the model signal form is associated with the work progress to be detected so that the user can specify the work progress to be detected.

Advantageously, the model signal form is predefined, in particular at the factory. In principle, it is conceivable that the model signal form is deposited or stored on the device, alternatively and/or additionally provided to the hand-held power tool, in particular from an external data device.

The person skilled in the art will recognize that the feature of the model signal form includes a signal form of a continuous progress of a working operation. In one embodiment, the model signal form is a condition-typical model signal form that is condition-typical for a particular work progress of the hand-held power tool. Examples of such work progress include resting of a screw head on a mounting support, freely rotating a loosened screw, turning a rotary impact mechanism of the hand-held power tool on or off, achieving a particular depth of screwing of a connecting means to be screwed in with the hand-held power tool, and/or striking the rotary impact mechanism without further rotating the struck element or tool holder.

In one embodiment of the disclosure, ascertaining the agreement evaluation in method step S3 comprises comparing the agreement between the signal of the operating variable and the model signal form with at least one threshold value of the agreement.

In one embodiment of the disclosure, in method step S2, the signal of the operating variable is recorded as a time curve of measured values of the operating variable, or as measured values of the operating variable as a variable of the electric motor correlating to the time curve.

In embodiments of the disclosure, the signal of the operating variable is recorded in method step S2 as a time curve of measured values of the operating variable, and, in a method step S2*a*, there is a transformation of the time curve of the measured values of the operating variable into a curve of the measured values of the operating variable via a variable of the electric motor correlated with the time curve.

In principle, different operating variables can come into consideration as operating variables, which are recorded via a suitable measurement transducer. In this respect, it is particularly advantageous that no additional sensor is necessary in accordance with the present disclosure, because various sensors, for example for speed monitoring, preferably Hall sensors, are already installed in electric motors.

Advantageously, the operating variable is a speed of the electric motor or an operating variable correlating to the speed. For example, the fixed gear ratio of the electric motor to the impact mechanism results in a direct dependence of the motor speed on the frequency of the percussion. A further conceivable operating variable correlating to the speed is the motor current. As an operating variable of the electric motor, a motor voltage, a Hall signal of the motor, a battery current, or a battery voltage are also conceivable, wherein an acceleration of the electric motor, an acceleration of a tool holder, or a sound signal of an impact mechanism of the hand-held power tool is also conceivable as the operating variable.

In some embodiments, the signal of the operating variable is recorded in method step S2 as a time curve of measured values of the operating variable, or is recorded as measured values of the operating variable as a variable of the electric motor that correlates to the time curve, for example an acceleration, a jerking, in particular of a higher order, a power, an energy, a rotational angle of the electric motor, a rotational angle of the tool holder, or a frequency.

In the last mentioned embodiment, it can be ensured that a consistent periodicity of the signal to be investigated results, regardless of the motor speed.

In one embodiment of the disclosure, in method step S3, the signal of the operational variable is compared by means of a comparison method in order to determine whether at least a specified threshold value of the agreement is satisfied.

Preferably, the comparison method comprises at least one frequency-based comparison method and/or one comparative comparison method.

In this case, the decision as to whether a work progress to be detected has been identified in the signal of the operating variable can be made at least partly by means of the frequency-based comparison method, in particular a band-pass filtering and/or a frequency analysis.

In one embodiment, the frequency-based comparison method comprises at least band-pass filtering and/or frequency analysis, wherein the specified threshold value is at least 90%, in particular 95%, more particularly 98%, of a specified limit value.

For example, in band-pass filtering, the received signal of the operating variable is filtered via a band-pass whose penetration range agrees with the model signal form. A corresponding amplitude in the resulting signal is to be expected if the relevant work progress to be detected is present. The specified threshold value of the band-pass filtering can therefore be at least 90%, in particular 95%, more particularly 98%, of the corresponding amplitude in the work progress to be detected. The specified limit value can be the corresponding amplitude in the resulting signal of an ideal work progress to be detected.

By the known frequency-based comparison method of frequency analysis, the predetermined model signal form, for example a frequency spectrum of the work progress to be detected, can be searched in the recorded signals of the operational variable. A corresponding amplitude of the work progress to be detected is to be expected in the recorded signals of the operational variable. The specified threshold value of the frequency analysis can be at least 90%, in particular 95%, more particularly 98%, of the corresponding amplitude in the work progress to be detected. The specified limit value can be the corresponding amplitude in the received signals of an ideal work progress to be detected. An appropriate segmentation of the received signal of the operating variable can be necessary.

In one embodiment, the comparison method comprises at least one parameter estimate and/or a cross-correlation, wherein the specified threshold value is at least 40% of an agreement of the signal of the operational variable to the model signal form.

The measured signal of the operating variable can be compared to the model signal form by means of the comparative comparison method. The measured signal of the operating variable is ascertained such that it has substantially the same finite signal length as that of the model signal form. The comparison of the model signal form to the measured signal of the operating variable can be output as a signal of a finite length, in particular discrete or continuous. Depending on a degree of agreement or a deviation of the comparison, a result can be output as to whether the work progress to be detected is present. If the measured signal of the operational variable agrees at least to 40% with the model signal form, the work progress to be detected can be present. In addition, it is conceivable that the comparison method can output a degree of comparison in relation to one another by means of the comparison of the measured signal of the operating variable with the model signal form as the result of the comparison. In this case, the comparison of at least 60% to one another can be a criterion for the existence of the work progress to be detected. It is to be assumed that the lower limit for the agreement is 40% and the upper limit for the agreement is 90%. Accordingly, the upper limit for the deviation is 60% and the lower limit for the deviation is 10%.

In the parameter estimate, a comparison between the predetermined model signal form and the signal of the operating variable can be easily made. For this purpose, estimated parameters of the model signal form can be identified in order to adjust the model signal form to the measured signal of the operational quantities. By means of a comparison between the estimated parameters of the predetermined model signal form and a limit value, a result for the existence of the work progress to be detected can be ascertained. Then, a further assessment of the result of the comparison can be made as to whether the specified threshold value has been achieved. This rating can be either a quality determination of the estimated parameters or the agreement between the set model signal form and the detected signal of the operating variable.

In a further embodiment, method step S3 comprises a step S3*a* of a quality determination of the identification of the model signal form in the signal of the operating variable, wherein, in method step S4, the detection of the work progress is carried out at least in part on the basis of the quality determination. As a measure of quality determination, an adjustment quality of the estimated parameters can be ascertained.

In method step S4, a decision can be made as to whether the work progress to be detected in the signal has been identified, at least partially by means of the quality determination, in particular the measure of quality.

Additionally or alternatively to determining the quality, method step S3*a* can comprise a comparison determination of the identification of the model signal form and the signal of the operational variable. For example, the comparison of the estimated parameters of the model signal form to the measured signal of the operating variable can be 70%, in particular 60%, more particularly 50%. In method step S4, the decision as to whether the work progress to be detected is present is made at least in part on the basis of the comparison determination. The decision on the presence of the work progress to be detected can be made for the specified threshold value of at least 40% agreement of the measured signal of the operational variable and the model signal form.

In a cross-correlation, a comparison can be made between the predetermined model signal form and the measured signal of the operating variable. In the cross-correlation, the previously determined model signal form is correlated with the measured signal of the operating variable. When the model signal form is correlated with the measured signal of the operating variable, a measure of the agreement of the two signals can be ascertained. For example, the degree of conformity can be 40%, in particular 50%, more particularly 60%.

In method step S4 of the method according to the disclosure, the detection of the work progress can occur at least partly on the basis of the cross-correlation of the model signal form to the measured signal of the operating variable. The detection can be carried out at least in part on the basis of the specified threshold value of at least 40% agreement of the measured signal of the operational variable and the model signal form.

In one embodiment, the threshold value of the agreement can be predefined by a user of the hand-held power tool or by way of factory pre-settings.

In one embodiment, the method according to the disclosure comprises the following method step:

S5 executing a first routine of the hand-held power tool based at least partly on the work progress detected in method step S4.

According to the present disclosure, the hand-held power tool can thus react to different applications. The first routine can comprise a change, in particular a reduction and/or an increase, of a speed of the electric motor. The first routine can be, by way of example, an immediate drop in speed, an immediate stop of the engine, a time-delayed decrease in speed, and/or a time-delayed stop of the engine. Furthermore, a combination of the various reactions is also possible.

In one embodiment, the first routine comprises the stopping of the electric motor, taking into account at least one parameter that is defined and/or specifiable, in particular specifiable by a user of the hand-held power tool. Examples of such a parameter include a period of time, a number of revolutions of the electric motor, a number of revolutions of the tool holder, an angle of rotation of the electric motor, and a number of impacts of the impact mechanism of the hand-held power tool.

In a further embodiment, the first routine comprises a change, in particular a reduction and/or an increase, of a speed of the electric motor. Such a change in the speed of the electric motor can be achieved, for example, by a change in motor current, motor voltage, battery current, or battery voltage, or by a combination of these measures.

In one embodiment of the disclosure, the first routine comprises optical, acoustic, and/or haptic feedback to a user.

Preferably, an amplitude of change in the speed of the electric motor can be defined by a user of the hand-held power tool. Alternatively or additionally, the change in the speed of the electric motor can also be specified by a target value. In this context, the term amplitude is also generally understood in terms of an amount of the change and is not exclusively associated with cyclic processes.

In one embodiment, the change in the speed of the electric motor occurs repeatedly and/or dynamically, in particular staggered over time and/or along a characteristic curve of the speed change and/or using the work progress of the hand-held power tool.

Furthermore, an amplitude of the change in the speed of the electric motor and/or a target value of the speed of the electric motor can be defined by a user of the hand-held power tool.

The first routine and/or characteristic parameters of the first routine can be adjusted and/or displayed by a user via an application software ("app") or a user interface ("human-machine interface," "HMI"). Furthermore, in one embodiment, the HMI can be arranged on the machine itself, while in other embodiments, the HMI can be arranged on external devices, for example, a smartphone, a tablet, or a computer.

The change in the speed of the electric motor can occur repeatedly and/or dynamically, in particular staggered over time and/or along a characteristic curve of the speed change and/or using the work progress of the hand-held power tool.

In an embodiment of the disclosure, the hand-held power tool is an impact wrench, in particular a rotary impact wrench, and a work progress to be detected comprises an impact without further rotation of a tool holder and/or a start or end of an impact operation, in particular a rotary impact operation.

The person skilled in the art will recognize that the method according to the disclosure thus allows the detection of the work progress independently of at least one target speed of the electric motor, at least one start-up characteristic of the electric motor, and/or at least one condition of charge of a power supply, in particular a battery, of the hand-held power tool.

The signal of the operating variable is to be considered a temporal sequence of measured values here. Alternatively and/or additionally, the signal of the operating variable can also be a frequency spectrum. Alternatively and/or additionally, the signal of the operating variable can also be reworked, for example smoothed, filtered, fitted, and the like.

In a further embodiment, the signal of the operating variable is stored in a memory, preferably a ring memory, in particular of the hand-held power tool, as a sequence of measured values.

In one method step, the work progress to be detected is identified by means of fewer than ten impacts of an impact mechanism of the hand-held power tool, in particular fewer than ten impact oscillation periods of the electric motor, preferably fewer than six impacts of an impact mechanism of the hand-held power tool, in particular fewer than six impact oscillation periods of the electric motor, very preferably fewer than four impacts of an impact mechanism, in particular fewer than four impact oscillation periods of the electric motor. In this context, an axial, radial, tangential, and/or circumferential impact of an impact striker, in particular a hammer, on an impact body, in particular an anvil, is to be understood as an impact of the impact mechanism. The impact oscillation period of the electric motor is correlated to the operating variable of the electric motor. An impact oscillation period of the electric motor can be ascertained based on fluctuations of the operating variable in the signal of the operating variable.

According to a further aspect, the disclosure comprises a hand-held power tool comprising an electric motor, a measurement transducer of an operating variable of the electric motor, and a control unit, wherein the control unit is configured so as to carry out the method according to the disclosure.

The electric motor of the hand-held power tool sets an input spindle into rotation, and an output spindle is connected to the tool holder. An anvil is rotationally connected to the output spindle, and a hammer is connected to the input spindle in such a way that, as a result of the rotational movement of the input spindle, it carries out an intermittent movement in the axial direction of the input spindle as well as an intermittent rotational movement about the input spindle, wherein the hammer thus intermittently impacts the anvil and thus exerts an impact and rotational impulse on the anvil and thus on the output spindle. A first sensor transmits a first signal to the control unit, for example to ascertain a motor rotary angle. Furthermore, a second sensor can transmit a second signal to the control unit in order to ascertain a motor speed.

Advantageously, the hand-held power tool has a memory unit in which various values can be stored.

In a further embodiment, the hand-held power tool is a battery-operated hand-held power tool, in particular a battery-operated impact wrench. In this way, a flexible and off-grid use of the hand-held power tool is ensured.

With the present disclosure, it is possible to omit as far as possible more complex methods of signal processing such as, for example, filters, signal loopbacks, system models (static as well as adaptive), and signal tracking.

In principle, no additional sensor technology (e.g. accelerometer) is necessary, nevertheless these evaluation methods can also be applied to signals of further sensor technology. Furthermore, in other motor concepts, which do not require speed detection, for example, this method can also be used with other signals.

In a preferred embodiment, the hand-held power tool is a cordless screwdriver, a drill, an impact drill, or a drill hammer, wherein a drill, a drill crown, or various bit attachments can be used as the tool. The hand-held power tool according to the disclosure is in particular configured as an impact wrench, wherein a higher peak torque for screwing in or unscrewing a screw or a screw nut is generated by the impulsive release of the motor energy. In this context, the transmission of electrical energy is to be understood in particular to mean that the hand-held power tool transmits energy to the body via a battery and/or via a power cable connection.

In addition, depending on the selected embodiment, the screwdriver can be flexible in the direction of rotation. In this way, the proposed method can be used in order to both screw-in and unscrew a screw and a screw nut, respectively.

In the context of the present disclosure, "ascertaining" is to include in particular measuring or recording, wherein "recording" is to be understood in the sense of measuring and storing, and "ascertaining" also is to include possible signal processing of a measured signal. Determining a signal by, for example, a classification or clustering Furthermore, "deciding" should also be understood as recognizing or detecting, wherein a clear allocation is to be achieved. "Identifying" means a detection of a partial agreement with a pattern, which can be enabled, for example, by a fitting of a signal to the pattern, a Fourier analysis, or the like. The "partial agreement" is to be understood such that the fitting has an error that is less than a specified threshold value, in particular less than 30%, quite in particular less than 20%.

Further features, possible applications, and advantages of the disclosure emerge from the following description of the embodiment example of the disclosure, which is shown in the drawing. It should be noted that the features described or depicted in the figures themselves or in any combination thereof describe the subject-matter of the disclosure irrespective of their summary in the claims or their reverse relationship, as well as irrespective of their formulation or illustration in the specification or drawing and have only a descriptive character and are not intended to restrict the disclosure in any way.

BRIEF DESCRIPTION OF THE DRAWINGS

The disclosure is explained in further detail in the following with reference to preferred embodiment examples. The drawings are schematic and show:

FIG. 2(*b*) an agreement of the operating variable signal shown in FIG. 2(*a*) with a model signal;

FIG. 10(*b*) an amplitude function of a first frequency contained in the signal of FIG. 10(*a*);

FIG. 10(*c*) an amplitude function of a second frequency contained in the signal of FIG. 10(*a*);

DETAILED DESCRIPTION

Figure 1:
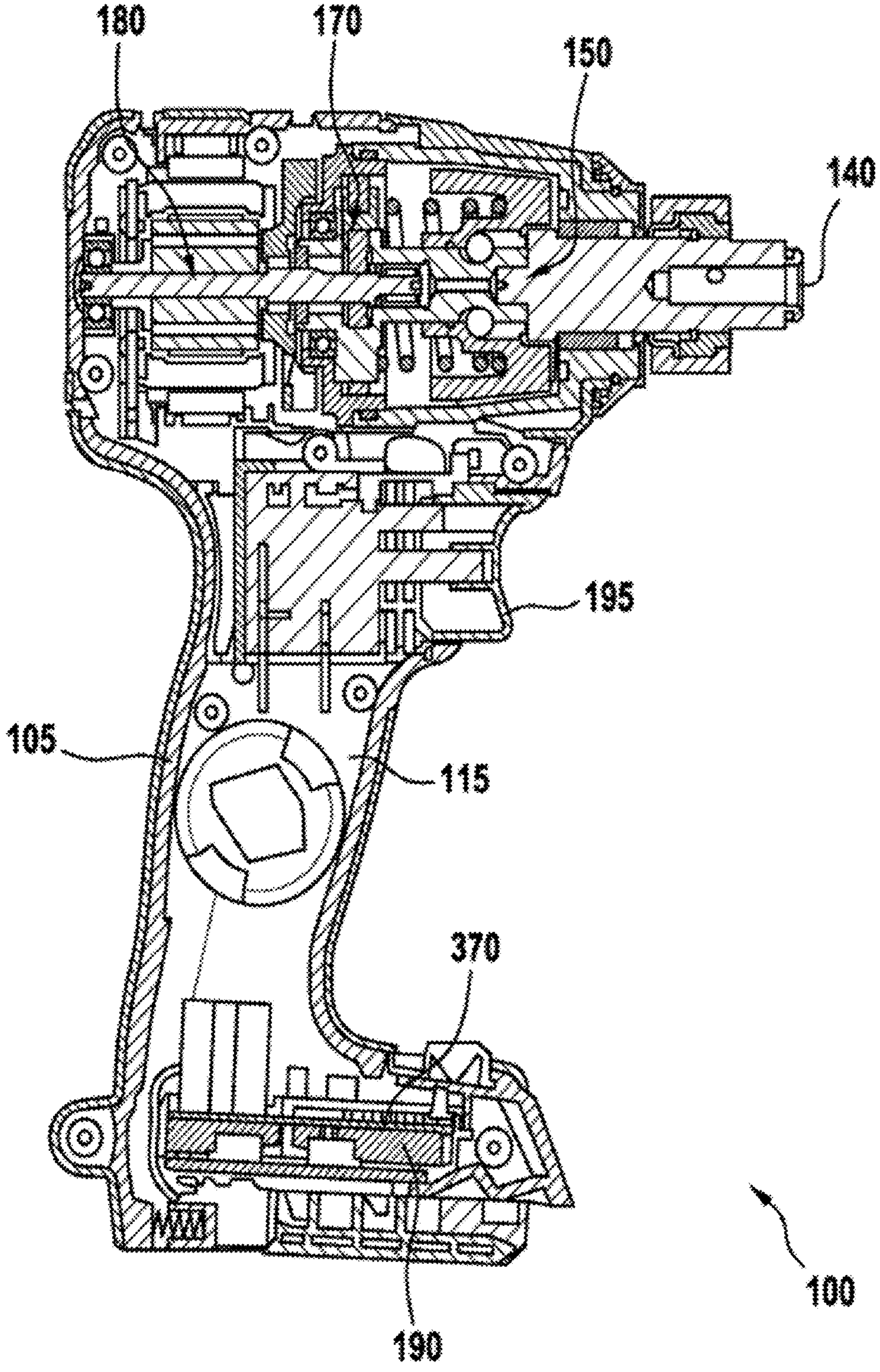
FIG. 1 a schematic illustration of a hand-held power tool.

FIG. 1 shows a hand-held power tool 100 according to the disclosure having a housing 105 with a handle 115. According to the embodiment shown, the hand-held power tool 100 is mechanically and electrically connectable to a battery pack 190 for off-grid power supply. In FIG. 1, the hand-held power tool 100 is configured by way of example as a battery-operated impact wrench. It is noted, however, that the present disclosure is not limited to battery-operated impact wrenches, but in principle can find application in hand-held power tools 100 where it is necessary to detect a work progress, such as impact drills.

A powered electric motor 180 and a transmission 170 from the battery pack 190 are arranged within the housing 105. The electric motor 180 is connected to an input spindle via the transmission 170. Furthermore, a control unit 370 is arranged within the housing 105 in the region of the battery pack 190, which influences the electric motor 180 and the transmission 170 by means of, for example, a set motor speed n, a selected rotational pulse, a desired transmission gear x, or the like.

For example, the electric motor 180 is actuatable, i.e. switchable, via a hand switch 195, and can be any type of motor, for example, an electronically commutated motor or a DC motor. Generally, the electric motor 180 is electronically controllable or adjustable such that both a reversing operation and specifications regarding the desired motor speed n and the desired rotational pulse can be implemented. The functionality and construction of a suitable electric motor are sufficiently known from the prior art, so that a detailed description is omitted here for the purpose of shortening the description.

A tool holder 140 is rotatably supported in the housing 105 via an input spindle and an output spindle. The tool holder 140 serves to receive a tool and can be directly formed on the output spindle and connected thereto in a cap-like manner.

The control unit 370 is in communication with a power source and is configured so as to electronically controllably or adjustably drive the electric motor 180 using various current signals. The various current signals provide for different rotational pulses of the electric motor 180, wherein the current signals are directed to the electric motor 180 via a control line. For example, the power source can be configured as a battery or, as in the illustrated embodiment example, as a battery pack 190 or as a mains connection.

Furthermore, controls not shown in detail can be provided in order to adjust various modes of operation and/or the direction of rotation of the electric motor 180.

According to one aspect of the disclosure, there is provided a method for operating, for example, the hand-held power tool 100 shown in FIG. 1, by means of which it can be determined whether a screw connection carried out by the hand-held power tool has been properly carried out, the decision being at least partially based on the evaluation of the received signal of the electric motor.

Aspects of the method are based, among other things, on an examination of signal forms and a determination of a degree of agreement of these signal forms, which can correspond, for example, to an evaluation of a further rotation of an element driven by the hand-held power tool 100, such as a screw.

Figures 2A, 2B:
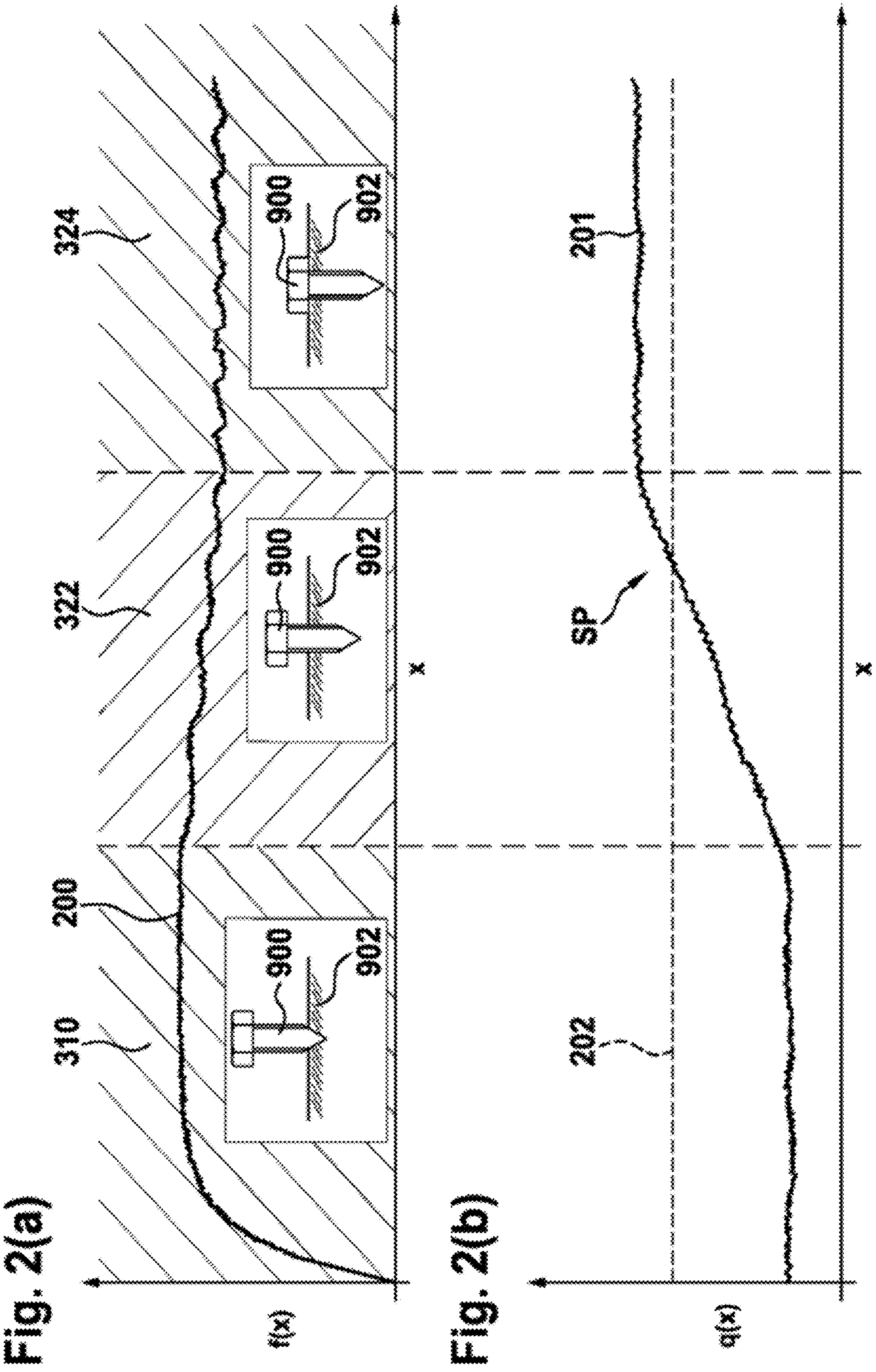
FIG. 2(*a*) a work progress of an exemplary application as well as an assigned signal of an operating variable.

In FIG. 2(*a*), in this regard, an application case of a loose fastening element, for example a self-tapping concrete screw 900, is shown in a fastening beam, for example a concrete component 902 made of reinforced concrete. In the context of this disclosure, carrying out such a screw connection is referred to as method step A.

In FIG. 2, an exemplary signal of an operating variable 200 of an electric motor 180 of a rotary impact wrench, as occurs identically or similarly when using a rotary impact wrench as intended, is also shown. While the following statements relate to an impact wrench, they also apply mutatis mutandis in the context of the disclosure to other hand-held power tools 100, for example, impact drills.

Providing a signal of an operating variable 200 of the electric motor 180 is referred to in the context of the present disclosure as method step S2. In this context, "providing" means making the corresponding feature available in an internal or external memory of the hand-held power tool 100.

According to the disclosure, in step C, an evaluation of the received signal of the operating variable 200 of the electric motor 180 is carried out. Principles of this evaluation are described below, among other things, by way of FIGS. 2(*a*) and 2(*b*). In a step D, a decision is made as to whether the screw connection has been properly carried out, the decision being at least partially based on the evaluation of the received signal of the operating variable 200 of the electric motor 180.

In the present example of FIG. 2, the time is plotted on the abscissa x as a reference variable. However, in an alternative embodiment, a variable correlated with time is plotted as a reference variable, such as the angle of rotation of the tool holder 140, the angle of rotation of the electric motor 180, an acceleration, a jerking, in particular of a higher order, a power, or an energy. On the ordinate f(x) in the figure, the motor speed n present at each time point is plotted. Instead of the motor speed, another operating variable correlating to the motor speed can also be selected. In alternative embodiments of the disclosure, for example, f(x) represents a signal of motor current.

Motor speed and motor current are operating variables that are typically sensed by a controller 370 on hand-held power tools 100, without any additional effort.

In preferred embodiments of the disclosure, a user of the hand-held power tool 100 can select on the basis of which operating variable the inventive method is to be carried out.

It can be seen in FIG. 2(*a*) that the signal comprises a first region 310 characterized by a monotonous increase in motor speed, as well as a range of comparatively constant motor speed, which can also be referred to as a plateau. The intersection point between abscissa x and ordinate f(x) in FIG. 2(*a*) corresponds to the start of the impact wrench during the screwing operation.

In the first region 310, the concrete screw 900 encounters a relatively low resistance in the concrete component 902, and the torque required for screwing is below the disengagement torque of the rotary impact mechanism. The curve of the motor speed in the first region 310 thus corresponds to the operating condition of the screw without percussion.

As can be seen in FIG. 2(*a*), the head of the concrete screw 900 in the region 322 does not rest on the concrete component 902, which means that the concrete screw 900 driven by the impact wrench is continually rotated with each impact. This additional rotary angle can decrease as the working operation proceeds, which is reflected in the figure by a smaller period duration. In addition, a further screwing can also be shown by a decreasing rotational speed on average.

The deeper the concrete screw 900 penetrates into the concrete component 902, the higher the impact frequency will become. The engine speed will in turn fluctuate at this impact frequency. The higher the impact frequency, the lower the motor speed simultaneously becomes. The original so-called "soft screwing case" increasingly becomes a "hard screwing case."

If the head of the concrete screw 900 subsequently reaches the concrete component 902, an even higher torque and thus more impact energy is necessary for further screwing in. However, because the hand-held power tool 100 no longer provides impact energy, the concrete screw 900 no longer rotates, or only by a significantly smaller rotational angle.

The rotary impact operation carried out in the second 322 and third region 324 is characterized by an oscillating curve of the signal of the operating variable 200, wherein the shape of the oscillation can be for example trigonometric or otherwise oscillating. In the present case, the oscillation has a curve which can be referred to as a modified trigonometric function. This characteristic shape of the signal of the operating variable 200 in the impact screwing operation results from the drawing up and free-running of the impact mechanism striker and the system chain located between the impact mechanism and the electric motor 180, among others, of the transmission 170.

As can be seen from the above explanation, the individual work progresses, for example the insertion of the percussion operation, are in principle characterized by certain characteristic features, which are at least partially specified by the inherent properties of the rotary impact wrench.

Detecting the work progress is taken into account in embodiments of the disclosure when deciding whether the screw connection has been properly carried out. In embodiments of the disclosure, one or more work progresses to be detected can be defined, upon detection of which it is decided in method step D that the screw connection was not carried out properly.

In other words, in embodiments of the disclosure, the decision as to whether the screw connection has been properly carried out is made at least partially based on a work progress detected upon the completion of the screw connection.

If, for example, it is determined that the work progress at the time of the end of the screwing operation corresponds to the condition in which a screw head already resting on the mounting carrier is continued to be rotated, this can be used as an indication that the thread grooved or cut into the screw base has been at least partially destroyed and the screw connection has accordingly not been carried out properly.

The work progress of the improper screw connection is characterized in such a case in that, with a continuous increase in the impact frequency during the screwing operation, a drop in the impact frequency, i.e. an increase in the motor speed when the speed amplitude is reduced, is registered.

In embodiments of the method according to the disclosure, a model signal form 240 is provided in a step S1 based on this finding. The model signal form 240 is attributable to a work progress, for example achieving the resting of the head of the concrete screw 900 on the concrete component 902, and in the context of some embodiments of the disclosure, the model signal form 240 is also referred to as a condition-typical model signal form. In other words, the model signal form 240 contains typical characteristics for the work progress such as the presence of a vibration curve, vibration frequencies or amplitudes, or individual signal sequences in continuous, quasi-continuous, or discrete form.

In other applications, the work progress to be detected can be characterized by other signal forms than vibrations, such as by discontinuities or growth rates in the function f(x). In such cases, the condition-typical model signal form is characterized by precisely these parameters, rather than vibrations.

In a preferred configuration of the inventive method, in method step S1, the condition-typical model signal form 240 can be defined by a user. Condition-typical model signal form 240 can also be stored or saved on-board or provided from an external data device.

In embodiments of the disclosure, in a method step S3 of the method according to the disclosure, the signal of the operating variable 200 of the electric motor 180 is compared to the condition-typical model signal form 240. The feature "comparing" is to be interpreted broadly and in the sense of a signal analysis in the context of the present disclosure, so that a result of the comparison can in particular also be a partial or gradual agreement of the signal of the operating variable 200 of the electric motor 180 to the model signal form 240, wherein the degree of agreement of the two signals can be ascertained by various mathematical methods, which will be mentioned later.

In step S3, an agreement evaluation of the signal of the operating variable 200 of the electric motor 180 is also ascertained from the comparison to the condition-typical model signal form 240, and thus a conclusion about the agreement of the two signals is made. The agreement evaluation can be at least partially based on a threshold value of the agreement, which can also be understood as a minimum measure of the agreement of the signal of the operating variable 200 to the model signal form 240, and will be explained in further detail in the following.

FIG. 2(*b*) shows a curve of a function q(x) of an agreement evaluation 201 corresponding to the signal of the operating variable 200 of FIG. 2(*a*), which indicates a value of the agreement between the signal of the operating variable 200 of the electric motor 180 and the condition-typical model signal form 240 at each location of the abscissa x.

In the present example of the screwing in of the concrete screw 900, this evaluation can be used in order to determine the extent of continued rotation for one impact. In the example, the model signal form 240 provided in step S1 corresponds to an ideal impact without further rotation, that is to say, the condition in which the head of the concrete screw 900 rests on the surface of the concrete component 902, as shown in region 324 of FIG. 2(*a*). Accordingly, in the region 324, there is a high agreement of the two signals, which is reflected by a consistently high value of the function q(x) of the agreement evaluation 201. In the region 310, on the other hand, in which each impact is associated with high rotational angles of the concrete screw 900, only small agreement values are achieved. The less the concrete screw 900 continues to rotate in the impact, the higher is this agreement, which can be seen from the fact that the function q(x) of the agreement evaluation 201 already reflects continuously increasing agreement values when the impact mechanism in the region 322 is started, which is characterized by a continuously smaller angle of rotation of the concrete screw 200 due to the increasing screw-in resistance.

As can be seen in the example of FIG. 2, the agreement evaluation 201 of the signals for impact differentiation is well-suited for this due to its more or less abrupt characteristic, wherein this abrupt change is due to the also more or less abrupt change in the further rotational angle of the concrete screw 900 when completing the exemplary operation. Detecting work progress can be done at least partly by comparing the agreement evaluation 201 to the threshold value of the agreement, which is indicated by a dashed line 202 in FIG. 2(*b*). In the present example of FIG. 2(*b*), the intersection point SP of the function q(x) of the agreement evaluation 201 with line 202 is associated with the work progress of abutting the head of the concrete screw 900 on the surface of the fastening beam 902.

In a method step S4 of the method according to the disclosure, the work progress is now at least partly detected based on the agreement evaluation 201 ascertained in method step S3. It should be noted that the function is not only limited to screwing-in applications, but also comprises a use in unscrewing applications.

Advantageously, the detection of the work progress carried out in step S4 is supplemented by a further method step in which a first routine of the hand-held power tool 100 is carried out at least partially based on the work progress detected in method step S4, as explained below.

In addition to deciding whether a screw connection has been properly carried out, the method in these embodiments assists the user by automating the screw connection to carry out proper screw connections.

It is hereby assumed that the work progress to be detected, as a result of which the hand-held power tool carries out the aforementioned first routine, has been defined by the model signal form 240 and/or threshold value of the agreement. However, it is also provided in alternative embodiments that the first routine is estimated in unknown use cases with the aid of known use cases, with similar characteristics.

Despite the resulting reduction in speed when switching the operating condition to impact operation, it is very difficult to prevent the screw head from penetrating the material, for example in case of small wood screws or self-tapping screws. This is because the impacts of the impact system result in a high spindle speed, even with increasing torque.

Figure 3:
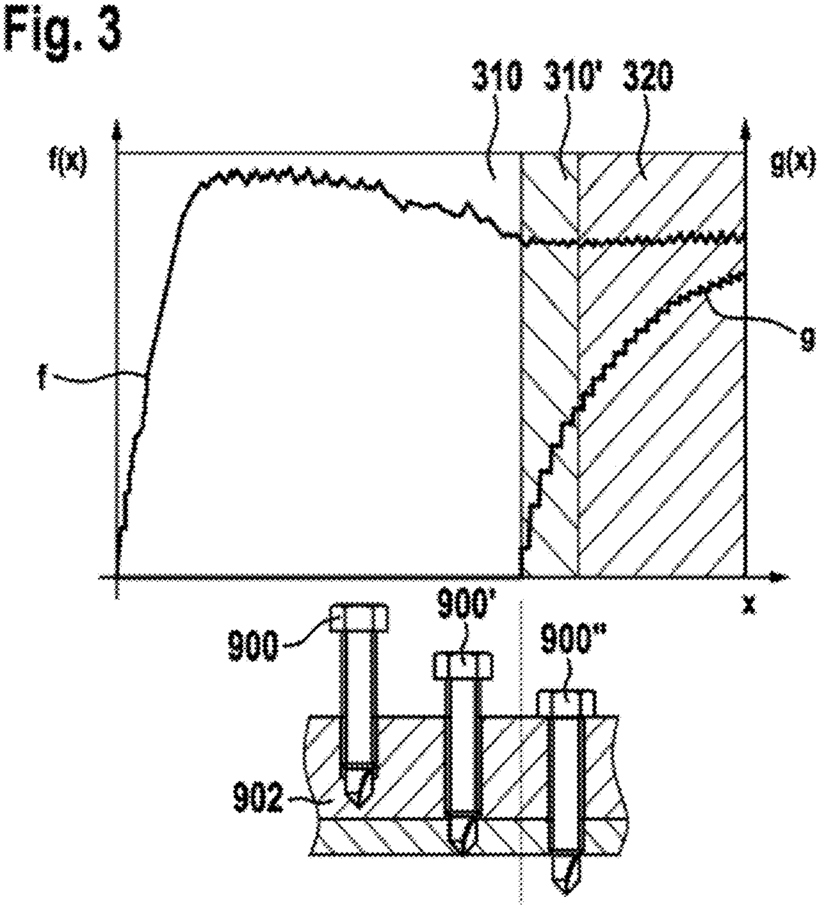
FIG. 3 a work progress of an exemplary application as well as two assigned signals of operating variables.

This behavior is shown in FIG. 3. As in FIG. 2, time is plotted on the abscissa x, for example, while a motor speed is plotted on the ordinate f(x), and torque g(x) is plotted on the ordinate g(x). Accordingly, graphs f and g indicate the curves of the motor speed f and the torque g over time. In the lower region of FIG. 3, again similar to the illustration of FIG. 2, schematically different states are shown in a screwing operation of a concrete screw 900, 900', and 900" into a concrete plate 902.

In the "No impact" operating condition represented in the figure by reference number 310, the screw rotates at high speed f and low torque g. In the operating condition "impact," characterized by reference number 320, the torque g increases rapidly, while the speed f only drops slightly, as noted above. The region 310' in FIG. 3 denotes the region within which the impact detection explained in connection with FIG. 2 takes place.

In order to prevent a further rotation of the concrete screw 900 in the case of contact of the screw head of the concrete screw 900 with the concrete component 902, which typically is associated with damage to the thread cut into the concrete plate 902, in embodiments of the disclosure, an application-based, appropriate routine or reaction of the tool is carried out based at least partly on the work progress detected in method step S4, a shutdown of the machine, a change in speed of the electric motor 180, and/or an optical acoustic, and/or haptic feedback to the user of the hand-held power tool 100.

In one embodiment of the disclosure, the first routine comprises the stopping of the electric motor 180, taking into account at least one parameter that is defined and/or specifiable, in particular specifiable by a user of the hand-held power tool.

Figure 4:
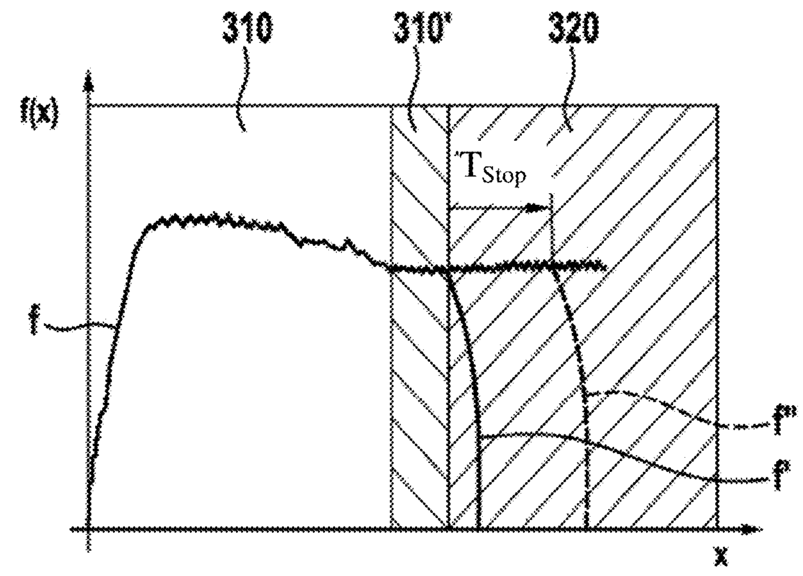
FIG. 4 curves of signals of an operating variable according to two embodiments of the invention disclosure.

For example, in FIG. 4, a stopping of the device directly after the impact detection 310' is shown schematically, whereby the user is assisted in avoiding a further rotation of the concrete screw 900 when the screw head is resting on the concrete component 902. In the figure, this is represented by the rapidly decreasing branch f' of graph f downstream of the region 310'.

An example of a defined and/or specifiable parameter, in particular specifiable by a user of the hand-held power tool 100, is a user-defined time after which the device stops, which is shown in FIG. 4 by the time period $T_{stop}$, as well as the associated branch f" of the graph f. Ideally, the hand-held power tool 100 stops precisely so that the screw head is flush with the screw support surface. However, because the time until this occurs is different from case to case, it is advantageous when the time period $T_{stop}$ can be defined by the user.

Figure 5:
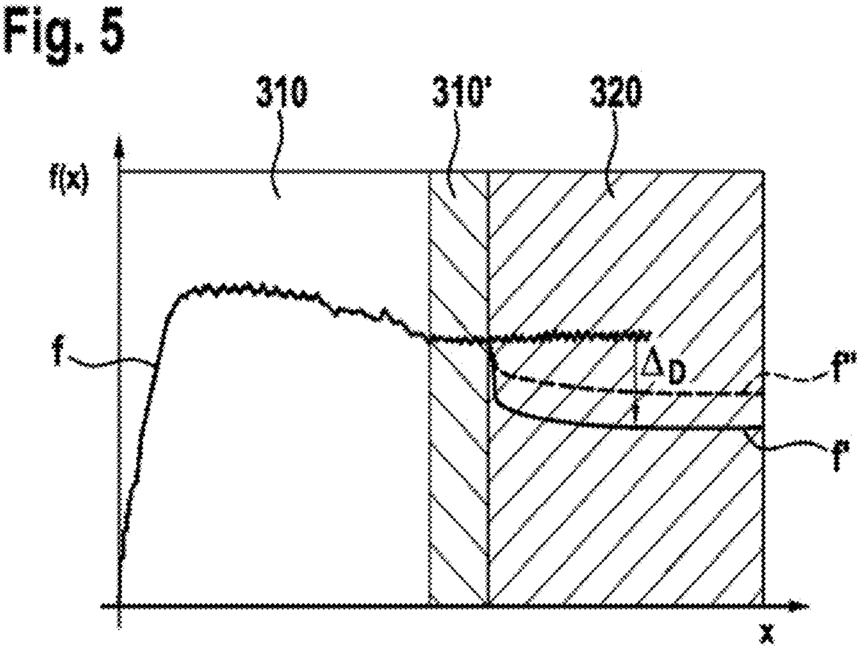
FIG. 5 curves of signals of an operating variable according to two embodiments of the disclosure.

Alternatively or additionally, in an embodiment of the disclosure, it is conceivable that the first routine comprises a change, in particular a reduction and/or an increase, of a speed, in particular a desired speed, of the electric motor 180 and thus also the spindle speed after impact detection. The embodiment in which a reduction in speed is carried out is shown in FIG. 5. Again, the hand-held power tool 100 is initially operated in the "No impact" operating condition 310, characterized by the motor speed curve represented by graph f. In the example, after impact detection has occurred in the region 310', the motor speed is reduced by a certain amplitude, which is represented by graphs f' or f".

The amplitude or height of the change in speed of the electric motor 180, for which the branch f" of the graph f in FIG. 5 is characterized by the $\Delta_D$, can be adjusted by the user in an embodiment of the disclosure. By lowering the speed, the user will have more time to respond as the screw head approaches the surface of the fastening beam 902. As soon as the user feels that the screw head is flush enough to the support surface, the user can use the switch to stop the hand-held power tool 100. Compared to stopping the hand-held power tool 100 after impact detection, the change in motor speed, in the example of FIG. 5, has the advantage that, by user-determined shutdown, this routine is largely independent of the application case.

In an embodiment of the disclosure, the amplitude $\Delta_D$ of the changing of the speed of the electric motor 180 and/or a target value of the speed of the electric motor 180 can be defined by a user of the hand-held power tool 100, which again increases the flexibility of this routine in terms of applicability for a wide variety of applications.

The change in speed of the electric motor 180 occurs repeatedly and/or dynamically in embodiments of the disclosure. In particular, the change of speed of the electric motor 180 can be staggered in time and/or taken along a characteristic of the change in speed, and/or depending upon the work progress of the hand-held power tool 100.

Examples of such include, but are not limited to, combinations of speed reduction and speed increase. In addition, various routines or combinations thereof can be carried out with a time offset for impact detection. Furthermore, the disclosure also comprises embodiments in which an offset in time between two or more routines is provided. For example, if the motor speed is reduced directly after impact detection, the motor speed can also be increased again after a certain time value. Embodiments are also provided in which not only different routines themselves, but also the time offset between the routines is specified by a characteristic curve.

Figure 6:
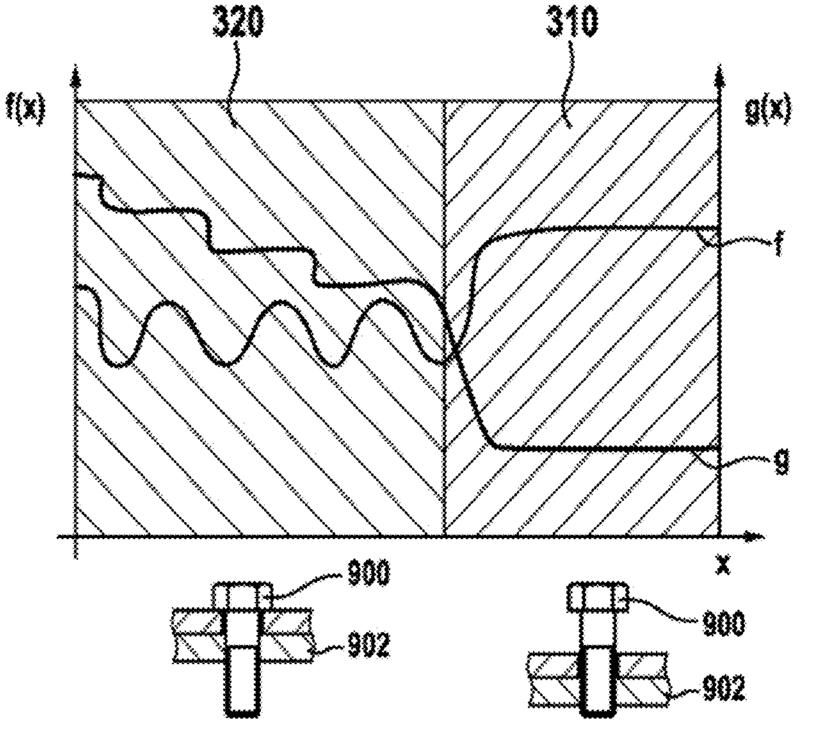
FIG. 6 a work progress of an exemplary application as well as two assigned signals of operating variables.

As noted above, the disclosure comprises embodiments in which the work progress is characterized by a change from operating condition "impact" in a region 320 to the operating condition "no impact" in a region 310, which is illustrated in FIG. 6.

Such a transition of the operating states of the hand-held power tool 100 is given, for example, in a work progress in which a concrete screw 900 comes loose from a fastening beam 902, i.e. in an unscrewing operation, which is shown schematically in the lower portion of FIG. 6. As in FIG. 3, in FIG. 6, graph f represents the speed of the electric motor 180, and graph g represents the torque.

As already explained in connection with other embodiments of the disclosure, the operating condition of the craft machine is also detected here with the aid of finding characteristic signal forms, in the present case the operating condition of the impact mechanism.

In the operating condition "impact," i.e. in the region 320 in FIG. 6, the concrete screw 900 does not rotate, and a high torque g is given. In other words, the spindle speed in this condition is equal to zero. In the operating condition "no impact," i.e. in FIG. 6 in the region 310, the torque g drops down quickly, which in turn provides an equally rapid increase in the spindle and motor speed f. Due to this rapid increase in motor speed f, caused by the decrease in torque g from the time the concrete screw 900 is loosened from the concrete component 902, it is often difficult for the user to intercept the loosening concrete screw 900 or nut and prevent it from falling down.

Figure 7:
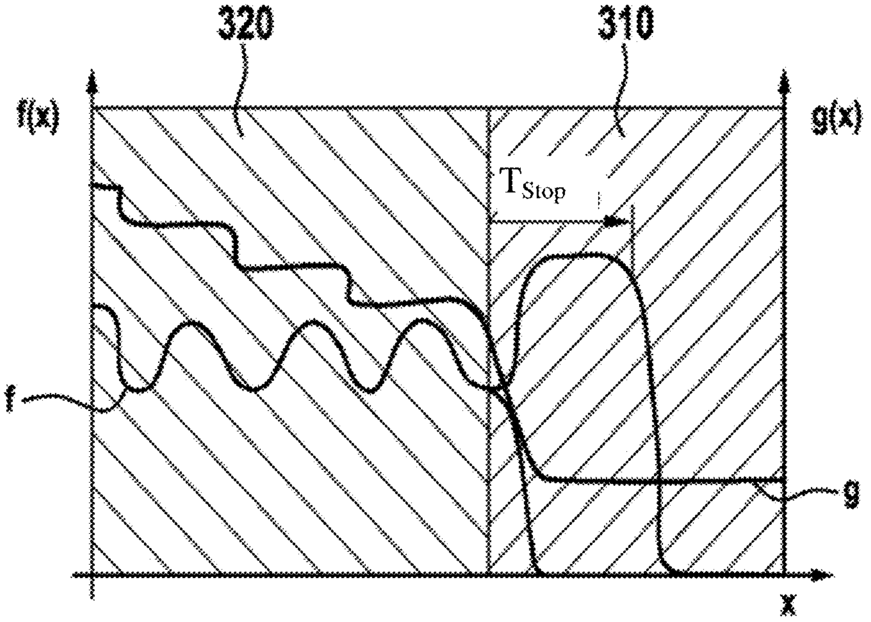
FIG. 7 curves of signals of two operating variables according to two embodiments of the disclosure.

The method according to the present disclosure can be used in order to prevent a threaded means, which can be a concrete screw 900 or a nut, from being unscrewed so quickly after release from the concrete component 902 that it falls down. Reference is made to FIG. 7 in this regard. With regard to the depicted axes and graphs, FIG. 7 corresponds essentially to FIG. 6, and corresponding reference numbers refer to corresponding characterizing features.

In one embodiment, the routine comprises stopping the hand-held power tool 100 directly after it is ascertained that the hand-held power tool 100 detects the work progress to be detected, in the example the "No impact" operating mode, which is shown in FIG. 7 by a steeply decreasing branch f' of the graph f of the motor speed in the region 310. In alternative embodiments, a time $T_{stop}$ can be defined by the user, after which the device stops. In the figure, this is represented by the branch f'' of the graph f of the motor speed. The person skilled in the art recognizes that the motor speed as also shown in FIG. 6 initially increases rapidly after transitioning from the region 320 (operational condition "impact") to the region 310 (operational condition "no impact") and drops sharply after the end of the period $T_{stop}$.

If the appropriate time period $T_{stop}$ is selected, it is possible that the motor speed falls to "zero" precisely when the concrete screw 900 or nut has been threaded. In this case, the user can remove the concrete screw 900 or nut with a few turns of the thread, or alternatively leave it in the thread in order to open a clamp, for example.

Figure 8:
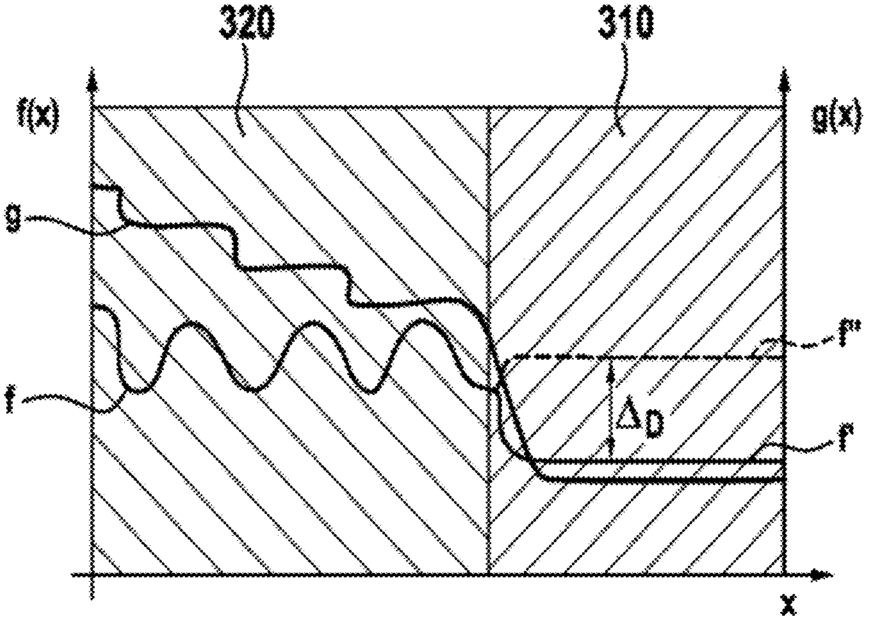
FIG. 8 curves of signals of two operating variables according to two embodiments of the disclosure.

A further embodiment example of the disclosure will now be described in the following with reference to FIG. 8. In this case, after transition from the region 320 (operating condition "impact") to the region 310 (operating condition "no impact"), the motor speed is reduced. The amplitude or height of the reduction is indicated in the figure with $\Delta_D$ as a measure between a mean f'' of the motor speed in the region 320 and the decreased motor speed f'. This drop can be adjusted by the user in certain embodiments, particularly by indicating a target value of the speed of the hand-held power tool 100 that is at the level of the branch f' in FIG. 8.

By lowering the motor speed and thus also the spindle speed, the user has more time to react when the head of the concrete screw 900 detaches from the screw support surface. Once the user believes that the screw head or nut has been screwed far enough, the switch can be used in order to stop the hand-held power tool 100.

Compared to the embodiments described in connection with FIG. 7, in which the hand-held power tool 100 is stopped directly or at a delay after transition from the region 320 (operational condition "impact") to the region 310 (operational condition "no impact"), the speed reduction has the advantage of further independence from the application case, because ultimately the user determines when the hand-held power tool is switched off after the speed reduction. This can be helpful, for example, in case of long threaded rods. Here, there are applications in which a more or less long unscrewing process must be carried out after the threaded rod has been detached and the associated suspension of the impact mechanism has occurred. Thus, switching off the hand-held power tool 100 after the impact mechanism has been suspended would not be appropriate in these cases.

Furthermore, an optimization of the routine can be carried out at least in part from the assessment by a further method step in which a quality assessment of the user of the hand-held power tool 100 is obtained with respect to the executed first routine.

In some embodiments of the disclosure, a work progress is output to a user of the hand-held power tool using an output apparatus of the hand-held power tool.

Some technical correlations and embodiments regarding the performance of the method steps S1-S4 will now be explained below.

In practical applications, it can be provided that one or more of the method steps S1 to S3 can be carried out repeatedly during operation of the hand-held power tool 100 in order to monitor the work progress of the executed application. For this purpose, in method step S2, a segmentation of the ascertained signal of the operating variable 200 can be carried out, so that the method step S3 are carried out on signal segments, preferably always of the same defined length.

For this purpose, the signal of the operating variable 200 can be stored in a memory, preferably a ring memory, as a result of measured values. In this embodiment, the hand-held power tool 100 comprises the memory, preferably the ring memory.

As already mentioned in connection with FIG. 2, in preferred embodiments of the disclosure, in method step S2, the signal of the operating variable 200 is ascertained as a time curve of measured values of the operating variable, or as measured values of the operating variable as a variable of the electric motor 180 correlating to the time curve. The measured values can be discrete, quasi-continuous, or continuous.

One embodiment provides that the signal of the operating variable 200 is recorded in method step S2 as a time curve of measured values of the operating variable and, in a method step S2*a* following method step S2, there is a transformation of the time curve of the measured values of the operating variable into a curve of the measured values of the operating variable as a variable of the electric motor 180 that correlates to the time curve, such as the rotational angle of the tool holder 140, the motor rotational angle, an acceleration, a jerking, in particular of a higher order, a power, or an energy.

Figure 9A:
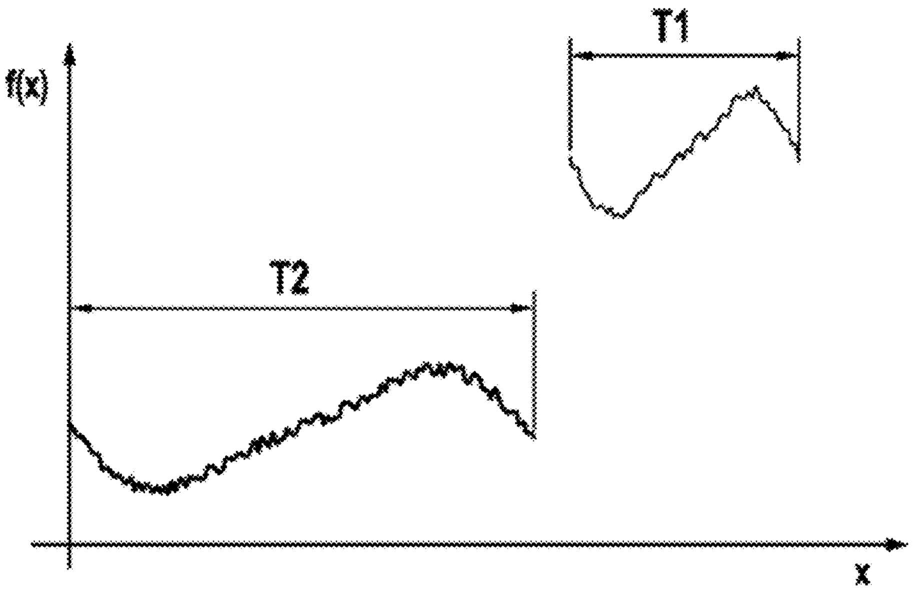
FIG. 9 a schematic illustration of two different records of the signal of the operating variable.
Figure 9B:
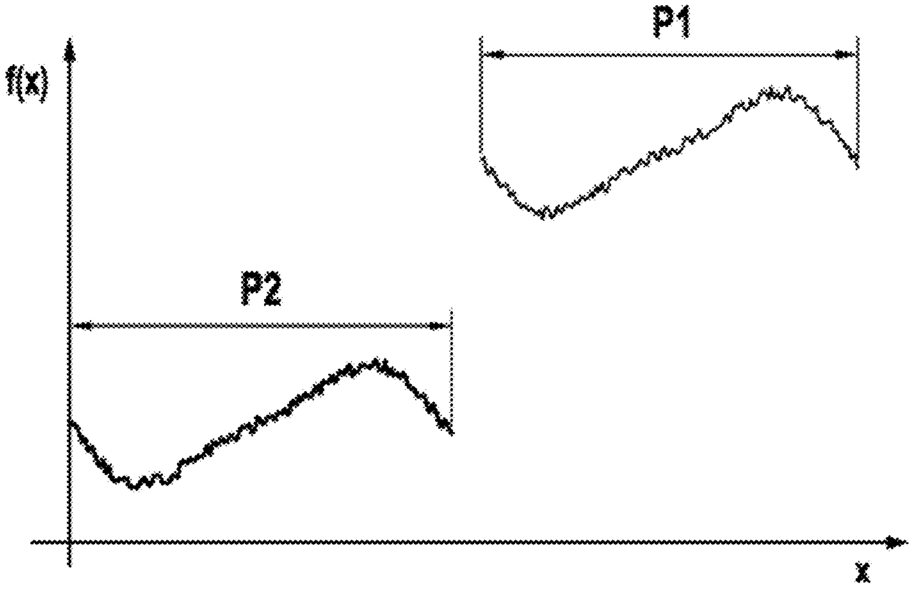

The advantages of this embodiment will be described below with reference to FIG. 9. Similar to FIG. 2, FIG. 9*a* shows signals f(x) of an operating variable 200 over an abscissa x, in this case over the time t. As in FIG. 2, the operating variable can be a motor speed or a parameter correlating to the motor speed.

The figure contains two signal curves of the operating variable 200, which can be respectively assigned to one work progress, i.e. in the case of a rotary impact wrench, for example, to the rotary impact screw mode. In both cases, the signal comprises a wavelength of an idealized vibration curve assumed to be sinusoidal, wherein the shorter wavelength signal, T1, has a curve with higher impact frequency and the longer wavelength signal, T2, has a curve with a lower impact frequency.

Both signals can be generated with the same hand-held power tool 100 at different motor speeds, and are dependent on, among other things, which revolution speed the user requests from the hand-held power tool 100 via the user switch.

If, for example, the parameter "wavelength" is now to be used in order to define the condition-typical model signal form 240, at least two different wavelengths T1 and T2 would have to be stored as possible parts of the condition-typical model signal form for the present case, so that the comparison of the signal of the operating variable 200 with the condition-typical model signal form 240 in both cases leads to the result "Agreement." Because the motor speed can change generally and to a large extent over time, this also causes the wavelength sought to vary, thereby requiring the methods for detecting this impact frequency to be adjusted adaptively accordingly.

With a plurality of possible wavelengths, the effort of the method and programming would increase accordingly.

Thus, in the preferred embodiment, the time values of the abscissa are transformed into values correlating to the time values, such as acceleration values, jerking values of a higher order, power values, energy values, frequency values, rotational angle values of the tool holder 140, or rotational angle values of the electric motor 180. This is possible because the fixed gear ratio of the electric motor 180 to the impact mechanism and the tool holder 140 results in a direct, known dependence of motor speed on the impact frequency. This normalization achieves a vibration signal of consistent periodicity independent of the motor speed, which is shown in FIG. 3*b* by the two signals belonging to T1 and T2, wherein both signals now have the same wavelength P1=P2.

Accordingly, in this embodiment of the disclosure, the condition-typical model signal form 240 can be validly ascertained for all speeds by a single parameter of the wavelength above the variable correlated to time, such as the rotational angle of the tool holder 140, the motor rotational angle, an acceleration, a jerking, in particular of a higher order, a power, or an energy.

In a preferred embodiment, the comparison of the signal of the operating variable 200 in method step S3 is carried out with a comparison method, wherein the comparison method comprises at least one frequency-based comparison method and/or one comparative comparison method. The comparison method compares the signal of the operating variable 200 with the condition-typical model signal form 240 too ascertain whether at least the threshold value of the agreement is met. The comparison method compares the measured signal of the operating variable 200 to the threshold value of the agreement. The frequency-based comparison method comprises at least band-pass filtering and/or frequency analysis. The comparative comparison method comprises at least the parameter estimate and/or the cross-correlation. The frequency-based and comparison methods will be described in further detail below.

In band-pass filtering embodiments, optionally as described, the input signal is filtered to a variable that correlates to the time via one or more band-passes that agreement the pass-through regions of one or more condition-typical model signal forms. The pass-through region results from the condition-typical model signal form 240. It is also conceivable that the pass-through region will agree with a frequency established in connection with the condition-typical model signal form 240. In the event that amplitudes of this frequency exceed a specified limit value, as is the case when the work progress to be detected is reached, the comparison in method step S3 then results in the outcome that the signal of the operating variable 200 is the same as the condition-typical model signal form 240 and that the work progress to be detected is thus achieved. Determining an amplitude limit value can be considered in this embodiment as ascertaining the agreement evaluation of the condition-typical model signal form 240 with the signal of the operating variable 200, on the basis of which it is decided whether the work progress to be detected is present or not in method step S4.

Figures 10A, 10B, 10C:
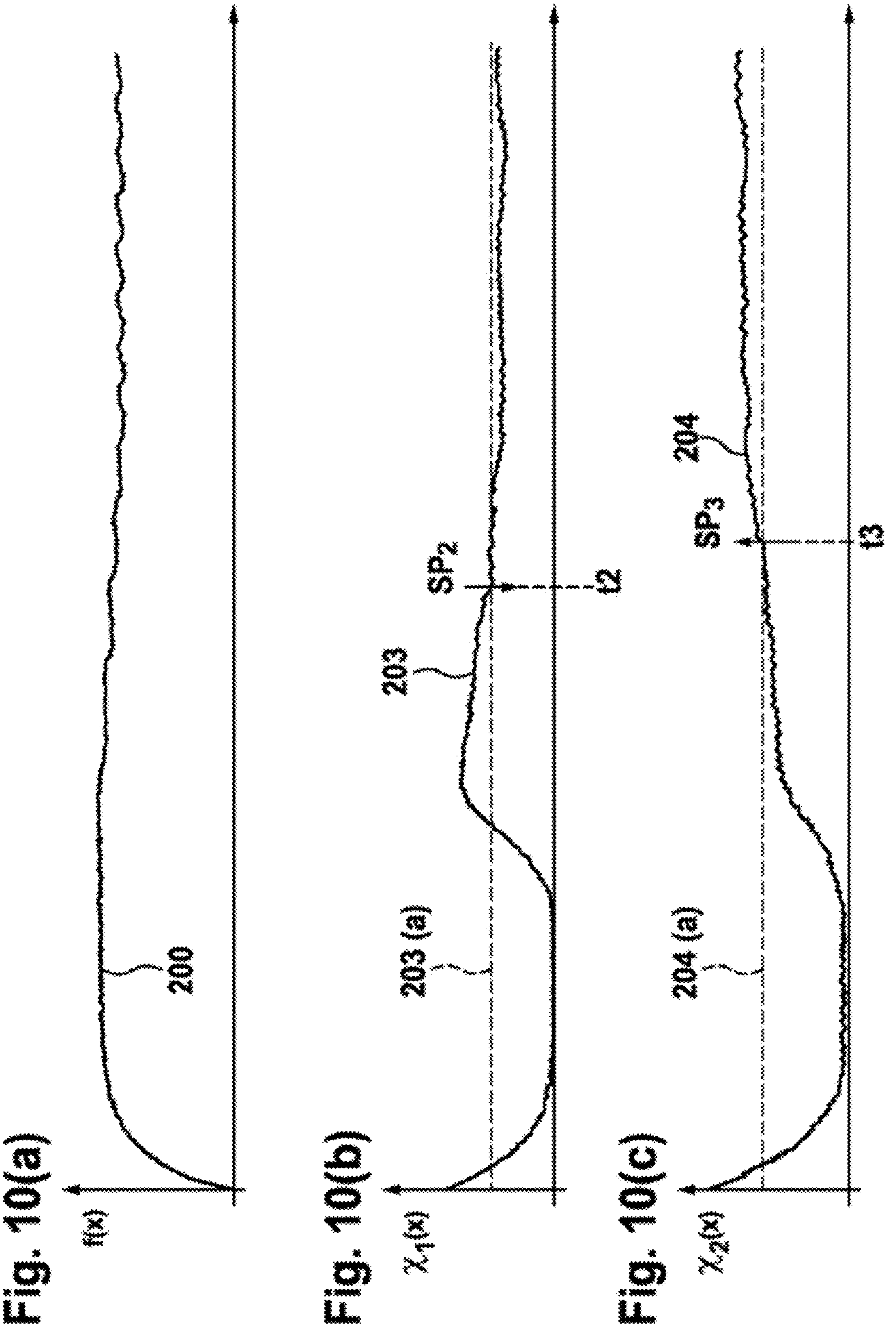
FIG. 10(*a*) a signal of an operating variable.

Based on FIG. 10, the embodiment is to be explained in which frequency analysis is used as a frequency-based comparison method. In this case, the signal of the operating variable 200 shown in FIG. 10(*a*), for example corresponding to the progression of the speed of the electric motor 180 over time, is transformed from a time range to the frequency range with corresponding weighting of the frequencies based on the frequency analysis, for example the fast Fourier transformation (FFT). In this respect, the term "time range" according to the above statements is to be understood both as a "course of the operating variable over time" as well as a "course of the operating variable as a variable correlating with time."

The frequency analysis in this characteristic is well known as a mathematical tool for signal analysis from many regions of technology and is used, among other things, to approximate measured signals as serial developments of weighted periodic, harmonic functions of different wavelengths. In FIG. 10(*b*) and 10(*c*), for example, weighting factors $\kappa_1(x)$ and $\kappa_2(x)$ as functional curves 203 and 204 indicate over time whether and how much the corresponding frequencies or frequency bands, which are not specified at this point for the sake of clarity, are present in the investigated signal, i.e. the progression of the operating variable 200.

With respect to the method according to the disclosure, it can be ascertained whether and at what amplitude the frequency associated with the condition-typical model signal form 240 is present in the signal of the operating variable 200 using the frequency analysis. Moreover, however, frequencies can also be defined whose absence is a measure of the work progress to be detected. As mentioned in the context of band-pass filtering, a limit value of the amplitude can be established, which is a measure of the degree of agreement of the signal of the operating variable 200 to the condition-typical model signal form 240.

In the example of FIG. 10(*b*), for example, at time t2 (point SP2), the amplitude κ1(x) of a first frequency, which is typically not found in the signal of the operating variable 200 in the condition-typical model signal 240, falls below an associated limit value 203(*a*), which in the example is a necessary but insufficient criterion for the existence of the work progress to be detected. At time t3 (point SP3), the amplitude κ2(*x*) of a second frequency typically found in the condition-typical model signal form 240 in the signal of the operating variable 200, exceeds an associated limit value 204(*a*). In the associated embodiment of the disclosure, the common presence of falling short of or exceeding the limit values 203(*a*), 204(*a*) due to the amplitude functions κ1(x) or κ2(x) is the relevant criterion for the evaluation of the agreement of the signal of the operating variable 200 with the conditional model signal form 240. Accordingly, in this case, it is ascertained in method step S4 that the work progress to be detected is achieved.

In alternative embodiments of the disclosure, only one of these criteria is used, or combinations of either or both criteria are used with other criteria, for example achieving a desired speed of the electric motor 180.

In embodiments in which the comparison method is used, the signal of the operational variable 200 is compared to the condition-typical model signal form 240 to determine whether the measured signal of the operational variable 200 has at least a 50% agreement with the condition-typical model signal form 240, and thus the specified threshold value is reached. It is also conceivable that the signal of the operating variable 200 will be compared with the condition-typical model signal form 240 in order to ascertain an agreement between the two signals.

In embodiments of the method according to the disclosure in which the parameter estimate is used as a comparative comparison method, the measured signal of the operating variables 200 is compared to the condition-typical model signal form 240, wherein estimated parameters are identified for the condition-typical model signal form 240. Using the estimated parameters, a measure of the agreement of the measured signal of the operating variables 200 with the condition-typical model signal form 240 can be ascertained as to whether the work progress to be detected has been achieved. The parameter estimate is based on the compensatory calculation, which is a mathematical optimization method known to the person skilled in the art. The mathematical optimization method, using the estimated parameters, makes it possible to adjust the condition-typical model signal form 240 to a series of measurement data of the signal of the operating variable 200. Depending on a measure of the agreement of the model signal form 240 parameterized by the estimated parameters and a limit value, the decision as to whether the work progress to be detected is achieved can be made.

Using the compensatory calculation of the comparison method of parameter estimation, a measure of an agreement of the estimated parameters of the condition-typical model signal form 240 to the measured signal of the operating variable 200 can also be ascertained.

In one embodiment of the inventive method, the method of cross-correlation is used as the comparative comparison method in the method step S3. Like the mathematical methods described above, the method of cross-correlation is known to the person skilled in the art. In the cross-correlation method, the condition-typical model signal form 240 is correlated to the measured signal of the operating variable 200.

Compared to the method of parameter estimation presented above, the result of the cross-correlation is again a signal sequence with an added signal length from a length of the signal of the operating variable 200 and the condition-typical model signal form 240, which represents the similarity of the time-offset input signals. The maximum of this output sequence represents the time of the highest agreement of the two signals, i.e. the signal of the operating variable 200 and the condition-typical model signal form 240, and is thus also a measure for the correlation itself, which is used in this embodiment in method step S4 as a decision criterion for achieving the work progress to be detected. In the implementation in the method according to the disclosure, a significant difference compared to the parameter estimate is that any of the condition-typical model signal forms can be used for the cross-correlation, while in the parameter estimate, the condition-typical model signal form 240 must be represented by parameterizable mathematical functions.

Figure 11A:
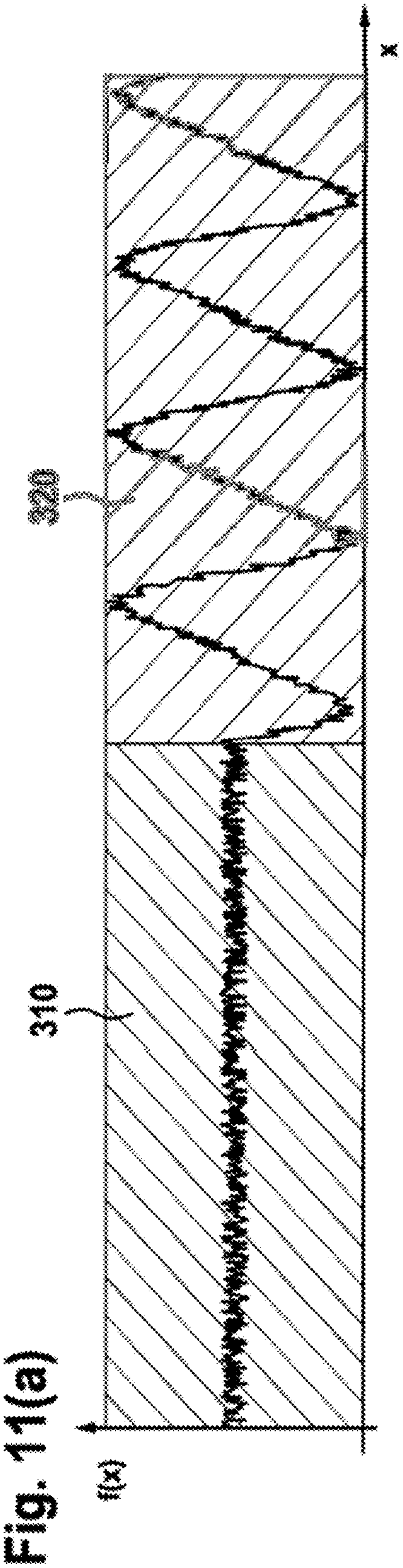
FIG. 11 a common illustration of a signal of an operating variable and an output signal of a band-pass filtering based on a model signal.
Figure 11B:
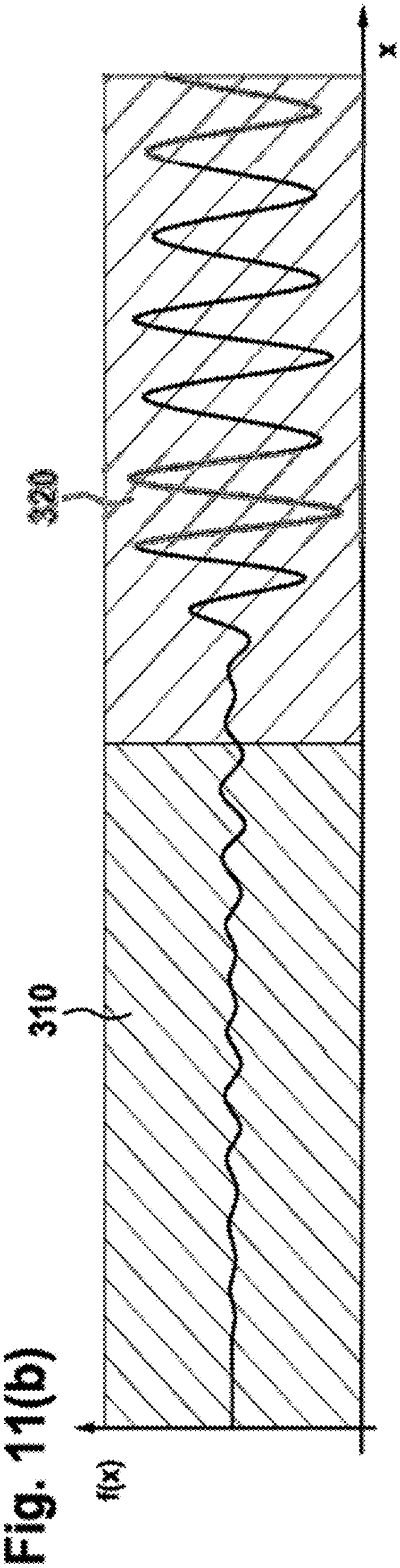
Figure 12A:
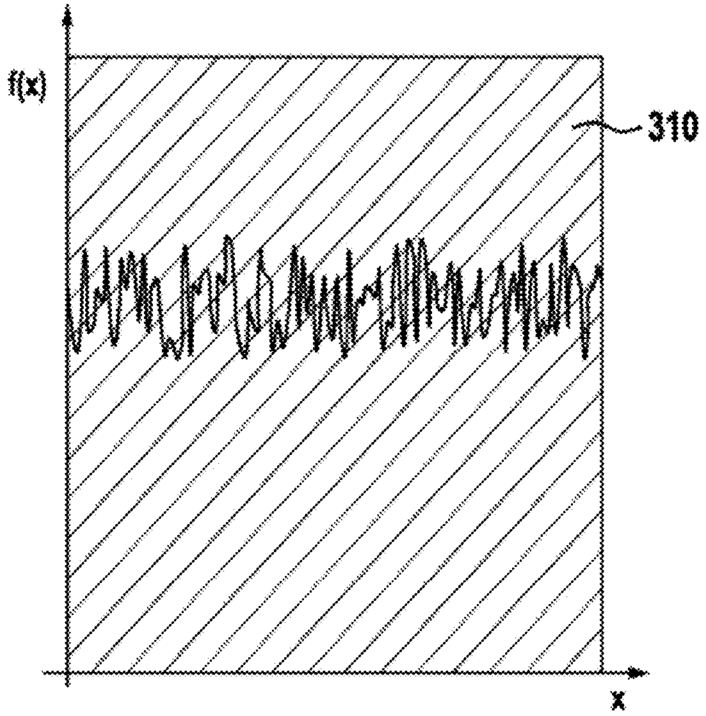
FIG. 12 a common illustration of a signal of an operating variable and an output of a frequency analysis based on a model signal.
Figure 12B:
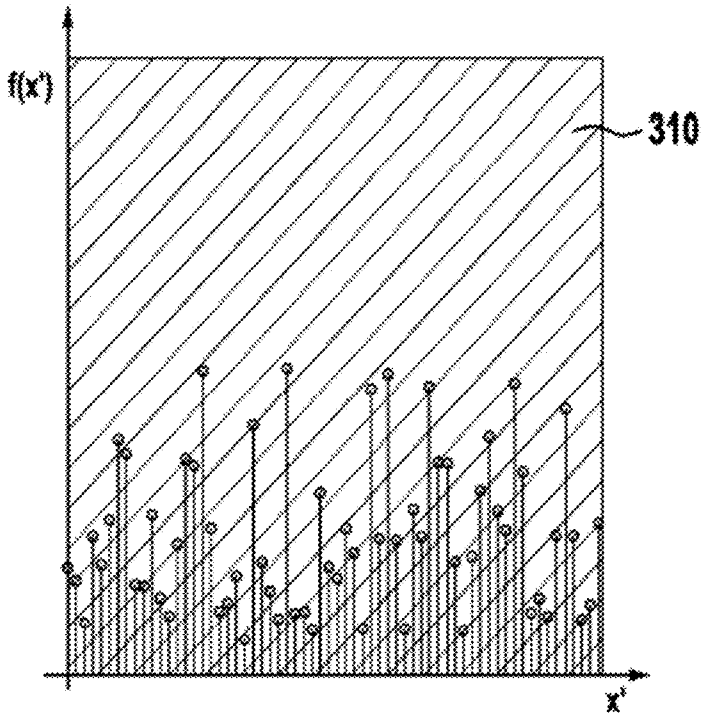
Figure 12C:
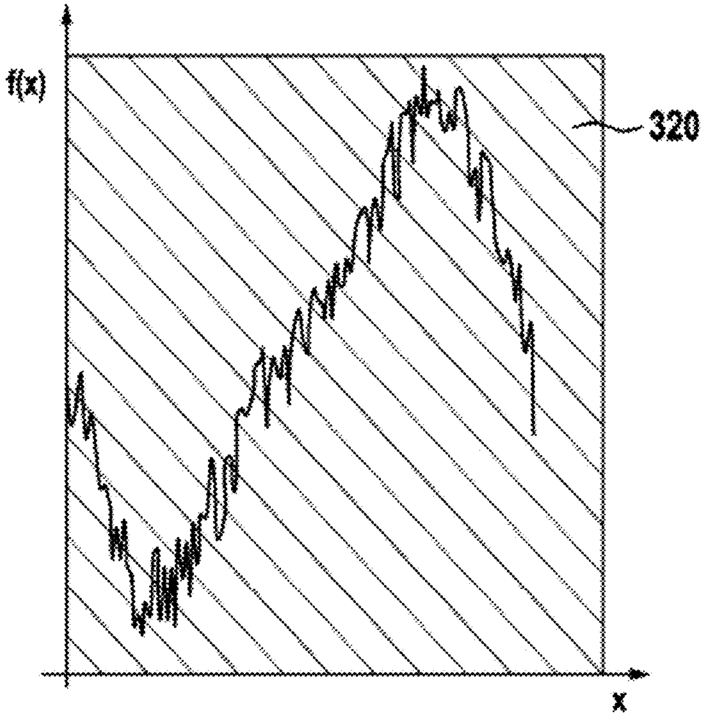
Figure 12D:
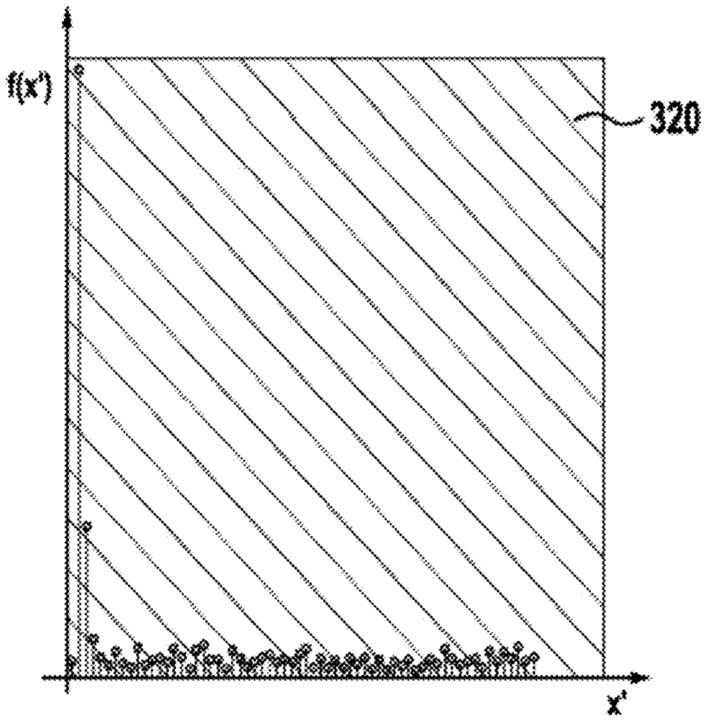

FIG. 11 shows the measured signal of the operating variable 200 in the event that band-pass filtering is used as the frequency-based comparison method. Herein, the time or a variable correlating to time is plotted as abscissa x. FIG. 11*a* shows the measured signal of the operating variable as the input signal of the band-pass filtering, wherein in the first region 310 the hand-held power tool 100 is operated in the screwing operation. In the second region 320, the hand-held power tool 100 is operated in the rotary impact operation. FIG. 11*b* shows the output signal after the band-pass has filtered the input signal.

FIG. 12 shows the measured signal of the operating variable 200 in the event that the frequency analysis is used as the frequency-based comparison method. FIGS. 12*a* and *b* show the first region 310 in which the hand-held power tool 100 is in the screwing operation. On the abscissa x of FIG. 6*a*, the time t or a variable correlated to time is plotted. In FIG. 12*b*, the signal of the operating variable 200 is shown transformed, wherein, for example, by means of a fast Fourier transformation, it can be transformed from a time range into a frequency range. For example, the frequency f is plotted on the abscissa x' of FIG. 12*b* so that the amplitudes of the signal of the operating variable 200 are represented. FIGS. 12*c* and *d* show the second region 320 in which the hand-held power tool 100 is in rotary impact operation. FIG. 12*c* shows the measured signal of the operating variable 200 plotted over time in the rotary impact operation. FIG. 12*d* shows the transformed signal of the operating variable 200, wherein the signal of the operating variable 200 is plotted via the frequency f as an abscissa x'. FIG. 12*d* shows characteristic amplitudes for the rotary impact operation.

Figure 13A:
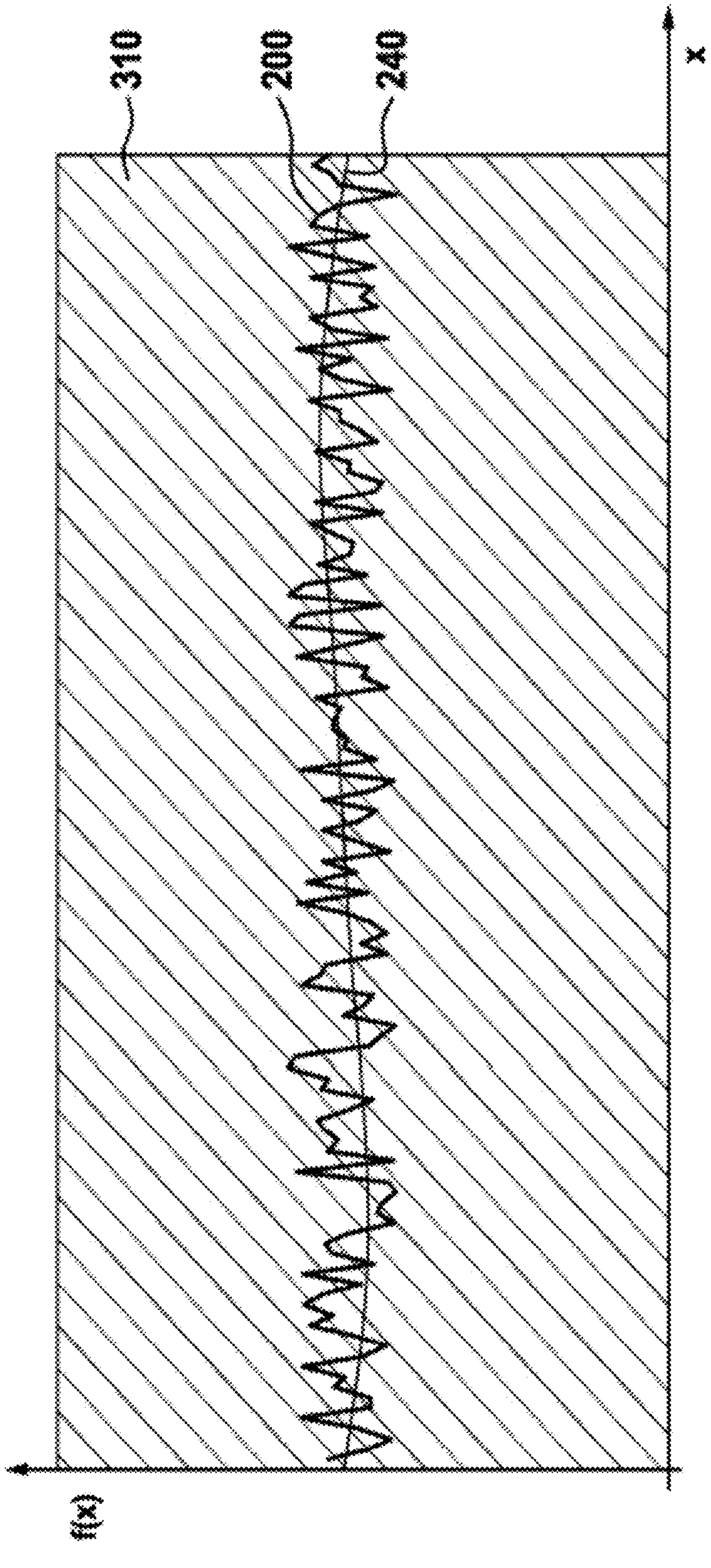
FIG. 13 a common illustration of a signal of an operating variable and a model signal for parameter estimation.

FIG. 13*a* shows a typical case of a comparison using the comparative comparison method of parameter estimation between the signal of an operating variable 200 and a condition-typical model signal form 240 in the first region 310 described in FIG. 2. While the model signal form 240 typical of the condition has a substantially trigonometric curve, the signal of the operating variable 200 has a curve that is greatly different therefrom. Regardless of the choice of one of the comparison methods described above, in this case the comparison carried out in method step S3 between the condition-typical model signal form 240 and the signal of the operating variable 200 results in the degree of agreement of the two signals being so low that the work progress to be detected is not detected in method step S4.

Figure 13B:
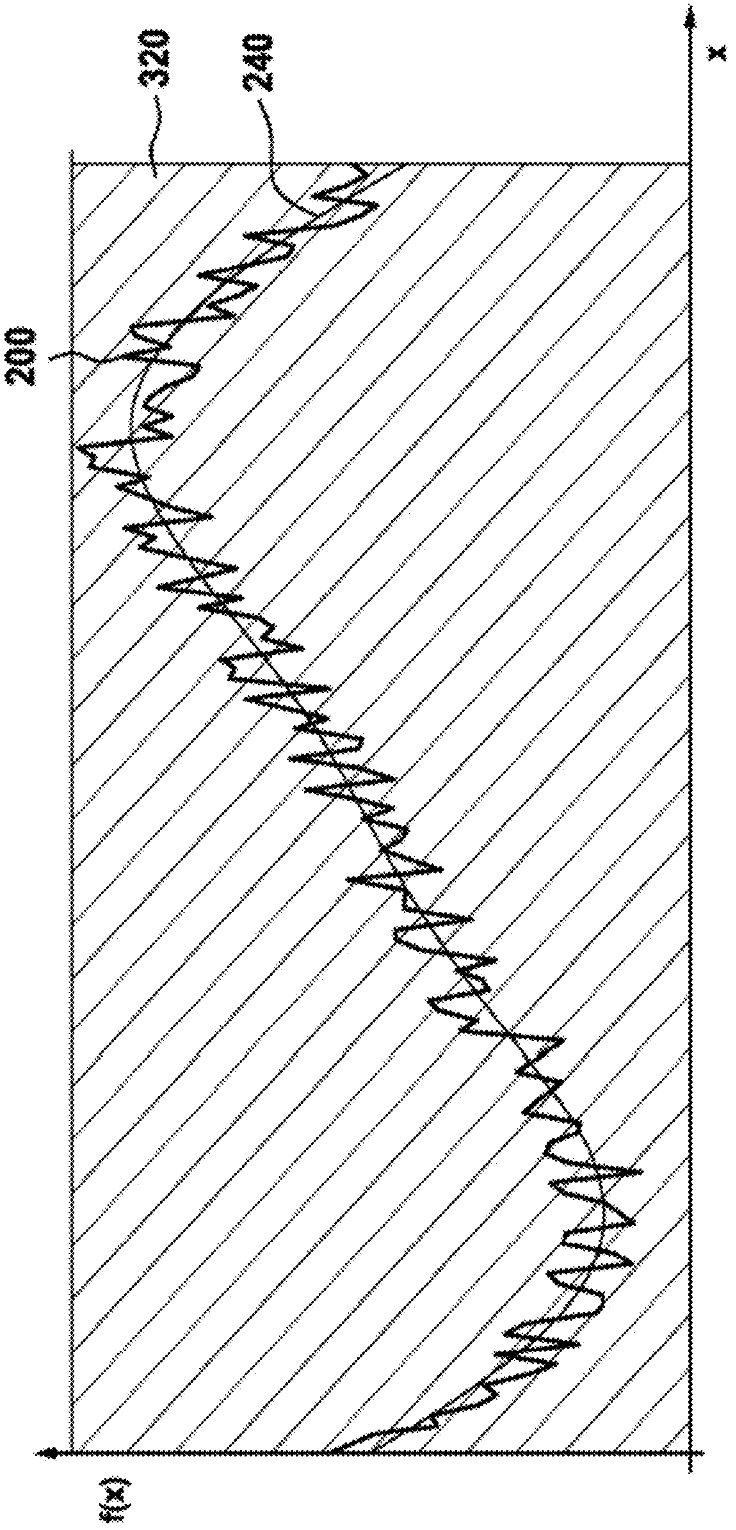

In FIG. 13*b*, on the other hand, the case is shown in which the work progress to be detected is given and therefore the model signal form 240 and the signal of the operating variable 200 have a high overall degree of agreement, even if deviations can be detected at individual measurement points. Thus, in the comparison method of parameter estimation, the decision as to whether the work progress to be detected has been achieved can be made.

Figure 14A:
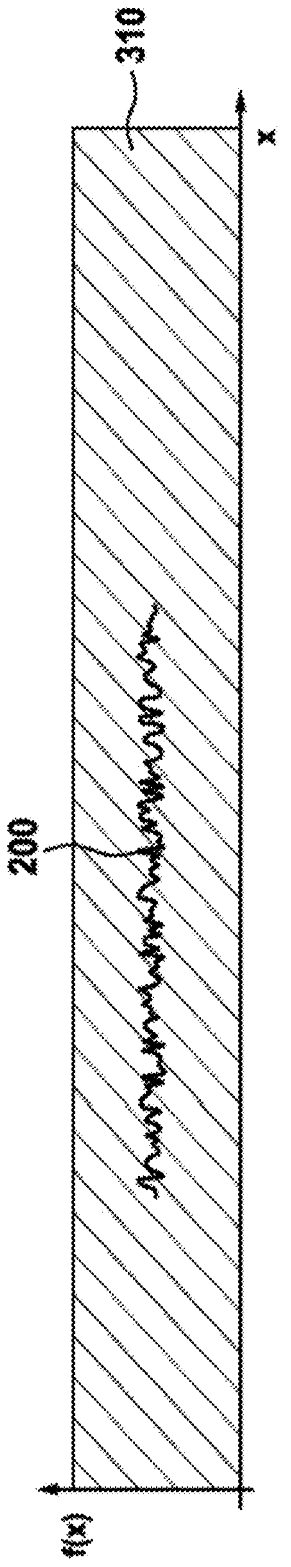
FIG. 14 a common illustration of a signal of an operating variable and a model signal for the cross-correlation.
Figure 14B:
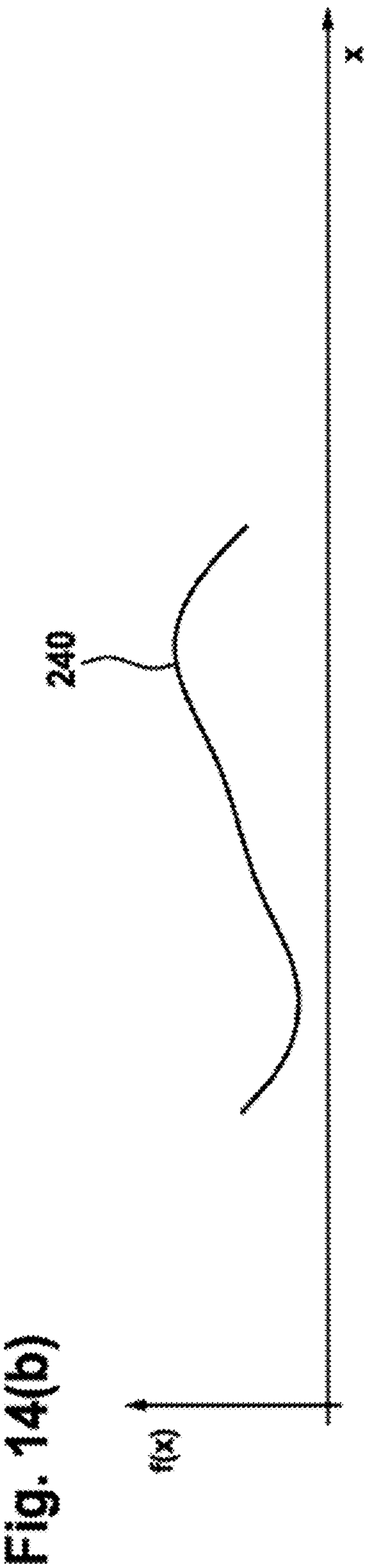
Figure 14C:
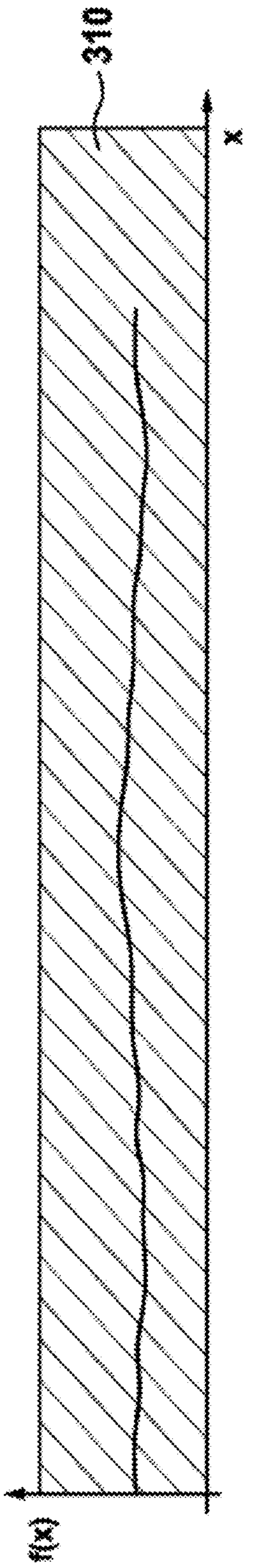
Figure 14D:
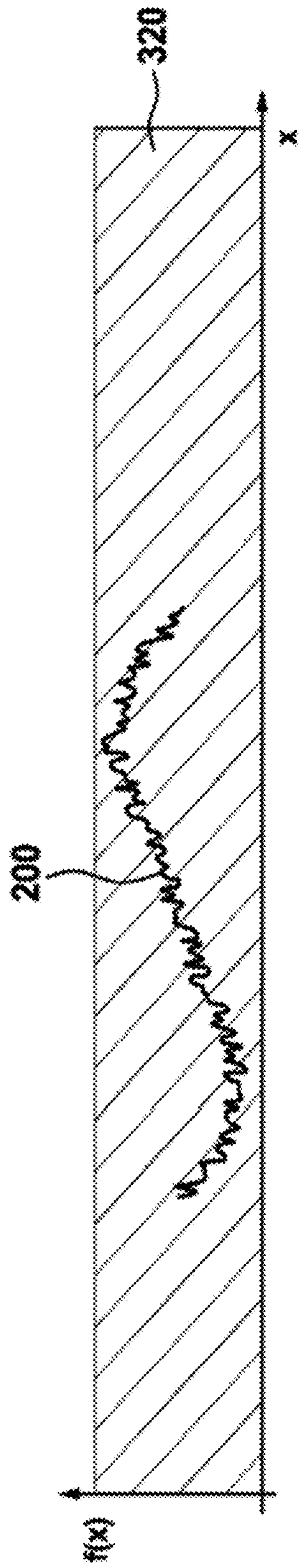
Figure 14E:
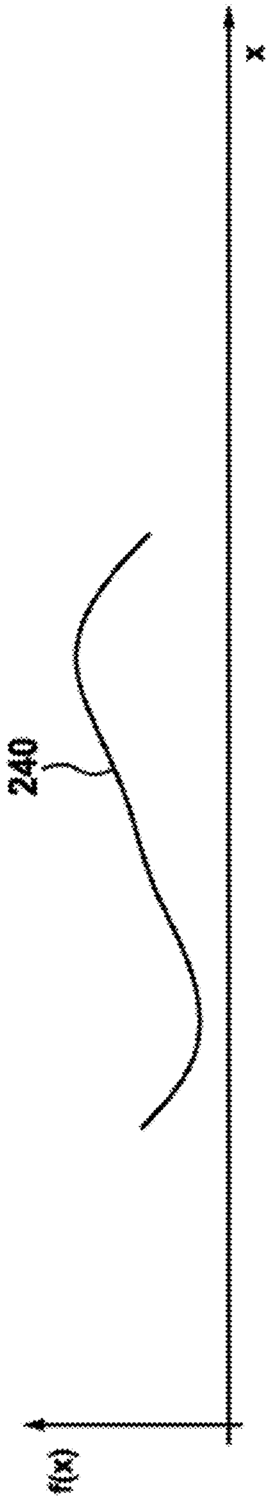
Figure 14F:
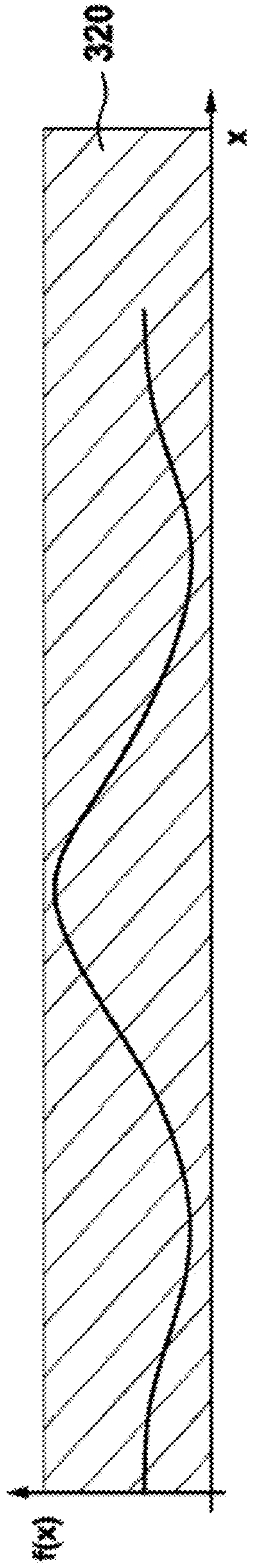

FIG. 14 shows the comparison of the condition-typical model signal form 240, see FIGS. 14*b* and 14*e*, with the measured signal of the operating variable 200, see FIGS. 14*a* and 14*d*, in the event that the cross-correlation is used as the comparison method. In FIGS. 14*a-f*, the time or a variable correlating to time is plotted on the abscissa x. FIGS. 14*a-c* show the first region 310 corresponding to the screwing operation. FIGS. 14*d-f* show the third region 324 corresponding to the work progress to be detected. As described further above, the measured signal of the operating variable, FIG. 14*a* and FIG. 14*d*, is correlated to the condition-typical model signal form, FIGS. 14*b* and 14*e*. The respective results of the correlations are shown in FIGS. 14*c* and 14*f*. In FIG. 14*c*, the result of the correlation during the first region 310 is shown, wherein it is discernible that there is a low agreement of the two signals. In the example of FIG. 14*c*, it is therefore decided in method step S4 that the work progress to be detected is not achieved. In FIG. 14*f*, the result of the correlation during the third region 324 is shown. It can be seen in FIG. 14*f* that there is a high agreement, so that in method step S4 it is decided that the work progress to be detected is achieved.

The disclosure is not limited to the embodiment example described and illustrated. Rather, it also encompasses all further developments by an expert within the scope of the disclosure as defined by the claims.

In addition to the described and illustrated embodiments, further embodiments are conceivable, which can include further modifications as well as combinations of features.

The invention claimed is:

1. A method for operating a hand-held power tool, the hand-held power tool having an electric motor, the method comprising:
- carrying out a screw connection of a connecting device in a support;
- providing at least one signal of an operating variable of the electric motor during the screw connection;
- evaluating the at least one signal of the operating variable of the electric motor; and
- deciding whether the screw connection has been properly carried out, the decision being at least partially based on the evaluation of the at least one signal of the operating variable of the electric motor,
- wherein the evaluating of the at least one signal of the electric motor comprises:
  - providing at least one condition-typical model signal form, wherein the condition-typical model signal form is assignable to a work progress of the hand-held power tool;
  - comparing the signal of the operating variable to the condition-typical model signal form and ascertaining an agreement evaluation from the comparison; and
  - detecting the work progress at least partly using the ascertained agreement evaluation.

2. The method according to claim 1, wherein the operating variable is a speed of the electric motor or an operating variable correlating to the speed.

3. The method for operating a hand-held power tool according to claim 1, wherein the connecting device is a self-tapping screw.

4. The method for operating a hand-held power tool according to claim 1, wherein the support consists at least partially of concrete.

5. The method for operating a hand-held power tool according to claim 1, further comprising visualizing the evaluation of the at least one signal of the electric motor on a human-machine interface of the hand-held power tool.

6. The method for operating a hand-held power tool according to claim 1, further comprising sending a notification regarding the evaluation of the at least one signal of the operating variable of the electric motor to an external device.

7. The method for operating a hand-held power tool according to claim 6, wherein the sending of a notification comprises sending a push notification to a hand-held device.

8. The method for operating a hand-held power tool according to claim 6, wherein the sending of a notification comprises sending a push notification to a smartphone.

9. The method for operating a hand-held power tool according to claim 1, further comprising documenting the evaluation of the at least one signal of the operating variable of the electric motor, which includes documenting an incorrectly processed screw connection in a documentation base.

10. The method for operating a hand-held power tool according to claim 9, wherein the documentation of the evaluation comprises detecting and storing a position of the screw connection.

11. The method for operating a hand-held power tool according to claim 1, wherein the model signal form is factory preset and/or can be specified and/or selected by a user.

12. The method for operating a hand-held power tool according to claim 1, wherein the ascertaining of the agreement evaluation comprises comparing the agreement between the signal of the operating variable and the model signal form to at least one threshold value of the agreement.

13. The method for operating a hand-held power tool according to claim 1, wherein the hand-held power tool is an impact wrench, and a work progress to be detected is an impact without further rotation of a tool holder.

14. A hand-held power tool comprising an electric motor, a measurement transducer of an operating variable of the electric motor, and a control unit, wherein the control unit is configured so as to carry out the method according to claim 1.

15. The method for operating a hand-held power tool according to claim 1, wherein the connecting device is a self-tapping concrete screw.

16. The method for operating a hand-held power tool according to claim 1, wherein the support consists at least partially of reinforced concrete.

17. The method for operating a hand-held power tool according to claim 1, further comprising visualizing the evaluation of the at least one signal of the electric motor on a human-machine interface of the hand-held power tool as an incorrect screw connection.

18. The method for operating a hand-held power tool according to claim 1, further comprising sending a notification regarding the evaluation of the at least one signal of the operating variable of the electric motor to an external device regarding an incorrectly processed screw connection.

19. A method for operating a hand-held power tool having an electric motor, the method comprising:

carrying out a screw connection of a connecting device in a support;

providing at least one signal of an operating variable of the electric motor during the screw connection;

evaluating the at least one signal of the operating variable of the electric motor; and deciding whether the screw connection has been properly carried out, the decision being at least partially based on the evaluation of the at least one signal of the operating variable of the electric motor, wherein the at least one signal of the operating variable is recorded in the providing of the at least one signal as a time curve of measured values of the operating variable, or as measured values of the operating variable via a variable of the electric motor correlated with the time curve.

20. The method for operating a hand-held power tool according to claim 19, wherein the evaluating of the at least one signal of the electric motor comprises:

providing at least one condition-typical model signal form, wherein the condition-typical model signal form is assignable to a work progress of the hand-held power tool;

comparing the signal of the operating variable to the condition-typical model signal form and ascertaining an agreement evaluation from the comparison; and detecting the work progress at least partly using the ascertained agreement evaluation.

* * * * *